US012291242B2

(12) United States Patent
Tsukamoto et al.

(10) Patent No.: US 12,291,242 B2
(45) Date of Patent: May 6, 2025

(54) MOBILE BODY CONTROL DEVICE, MOBILE BODY CONTROL METHOD, MOBILE BODY, INFORMATION PROCESSING METHOD, AND STORAGE MEDIUM

(71) Applicant: HONDA MOTOR CO., LTD., Tokyo (JP)

(72) Inventors: Nanami Tsukamoto, Wako (JP); Kosuke Nakanishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 138 days.

(21) Appl. No.: 18/118,873

(22) Filed: Mar. 8, 2023

(65) Prior Publication Data

US 2023/0294739 A1 Sep. 21, 2023

(30) Foreign Application Priority Data

Mar. 15, 2022 (JP) .................................. 2022-040719

(51) Int. Cl.
*B60W 60/00* (2020.01)
*B60W 30/18* (2012.01)
(Continued)

(52) U.S. Cl.
CPC .... *B60W 60/00253* (2020.02); *B60W 30/181* (2013.01); *G06V 20/56* (2022.01);
(Continued)

(58) Field of Classification Search
CPC ......... B60W 60/00253; B60W 30/181; B60W 2300/34; B60W 2420/403;
(Continued)

(56) References Cited

U.S. PATENT DOCUMENTS 11,858,531 B2 * 1/2024 Park .................... B60W 30/181
2019/0193733 A1 * 6/2019 Russell ................ B60W 30/18
(Continued)

FOREIGN PATENT DOCUMENTS

| EP | 2927638 A1 * | 10/2015 | .......... G01C 21/005 |
| JP | 2019-091216 A | 6/2019 | |
| JP | 2020-142720 A | 9/2020 | |

OTHER PUBLICATIONS

"Autonomous Vehicles Should Start Small, Go Slow" by Shaoshan Liu and Jean-Luc Gaudiot, 20 Fed 2020 IEEE Spectrum (Year: 2020).*

(Continued)

*Primary Examiner* — Michael V Kerrigan
*Assistant Examiner* — Tanya C Sienko
(74) *Attorney, Agent, or Firm* — Thomas Horstemeyer, LLP

(57) ABSTRACT

A mobile body control device adjusts a stop position of a mobile body based on an instruction of a user. The device acquires instruction information for designating a predetermined target and acquires a captured image captured in the mobile body. The device determines a stop position, which is a relative position of the predetermined target measured from the mobile body, where on a region of the predetermined target has been identified in the captured image and control traveling of the mobile body toward the determined stop position. When the predetermined target cannot be identified in the captured image when the mobile body is traveling toward the stop position, the device updates the stop position determined for the predetermined target in accordance with the movement of the mobile body, thereby controlling traveling of the mobile body toward the stop position.

14 Claims, 18 Drawing Sheets

(51) Int. Cl.
*G06V 20/56* (2022.01)
*G06V 40/10* (2022.01)

(52) U.S. Cl.
CPC ......... *G06V 40/10* (2022.01); *B60W 2300/34* (2013.01); *B60W 2420/403* (2013.01); *B60W 2540/041* (2020.02); *B60W 2556/40* (2020.02); *B60W 2556/50* (2020.02); *G06V 2201/07* (2022.01)

(58) Field of Classification Search
CPC ....... B60W 2540/041; B60W 2556/40; B60W 2556/50; G06V 20/56; G06V 40/10; G06V 2201/07

See application file for complete search history.

(56) References Cited

U.S. PATENT DOCUMENTS

| | | | |
|---|---|---|---|
| 2019/0212738 A1* | 7/2019 | Umetani | B60Q 1/507 |
| 2020/0285235 A1 | 9/2020 | Yamane et al. | |
| 2023/0154059 A1* | 5/2023 | Hincapie Ramos | G06V 20/70 |
| | | | 345/633 |

OTHER PUBLICATIONS

A cloud infrastructure for target detection and tracking using audio and video fusion by K. Liu et al., 2015 IEEE Conference on Computer Vision and Pattern Recognition Workshops (CVPRW) pp. 75-81 (Year: 2015).*
Machine translation of JP-2019091216A downloaded from Espacenet Sep. 19, 2024 (Year: 2024).*
Machine translation of JP 2020142720 downloaded from Espacenet 919/2024 (Year: 2024).*

* cited by examiner

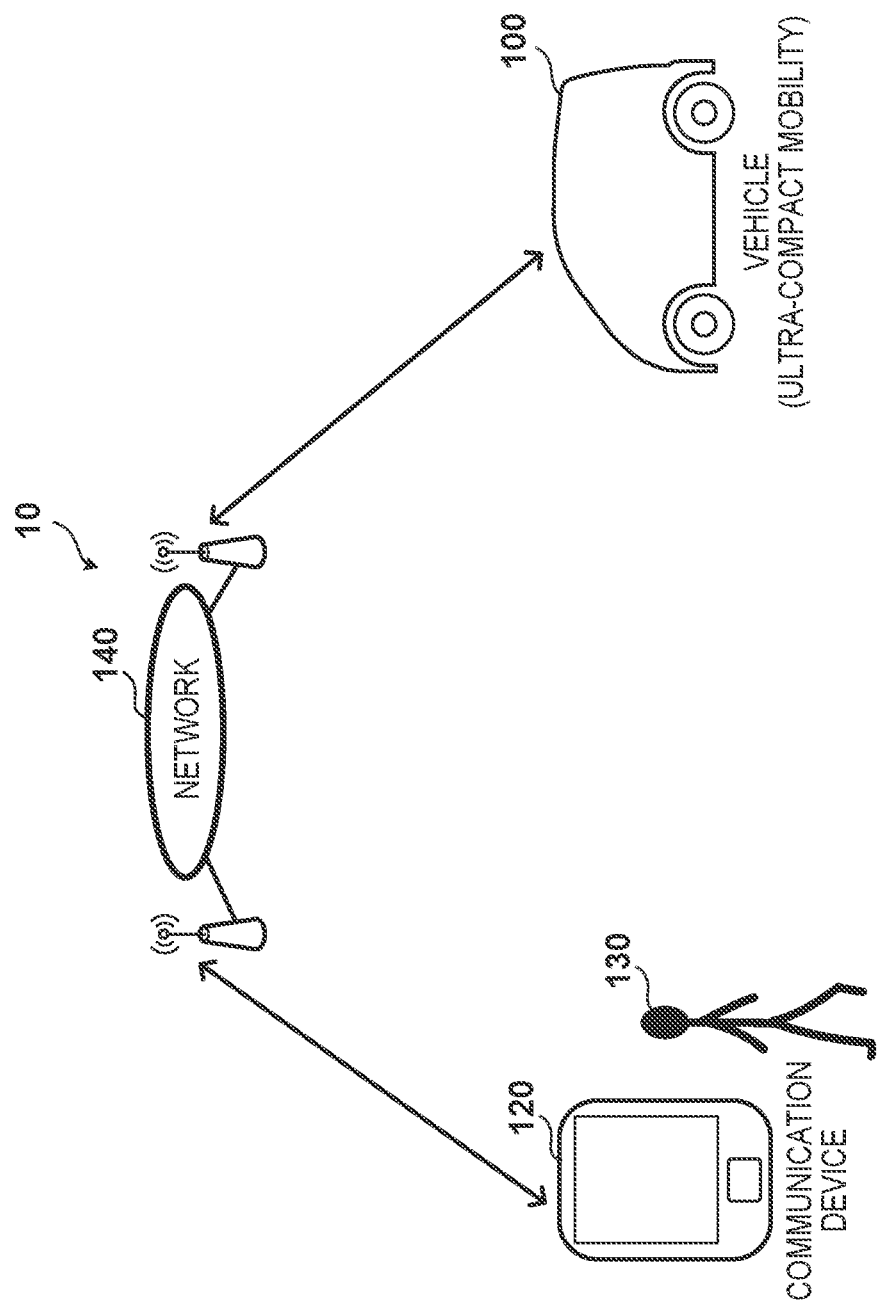

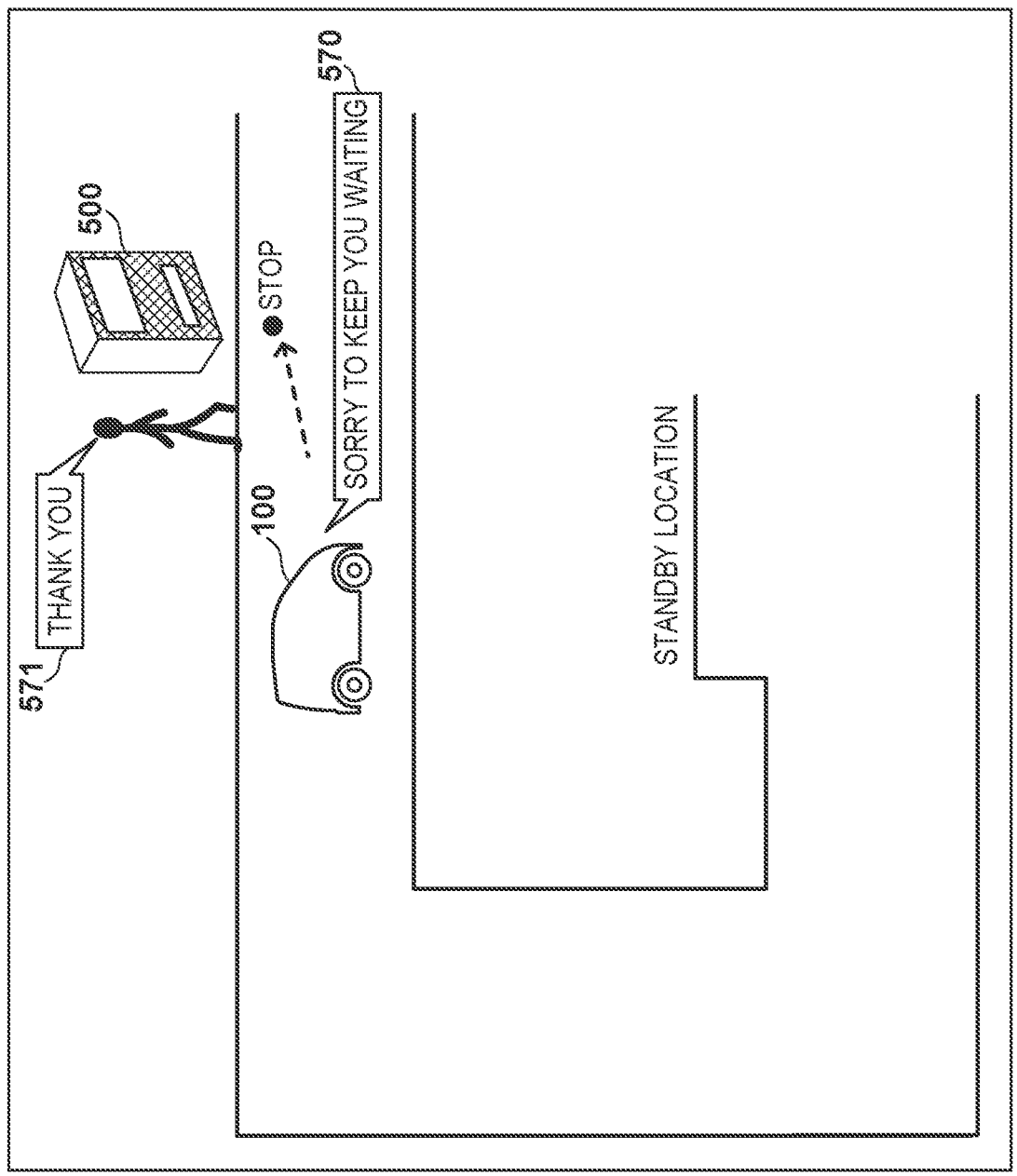

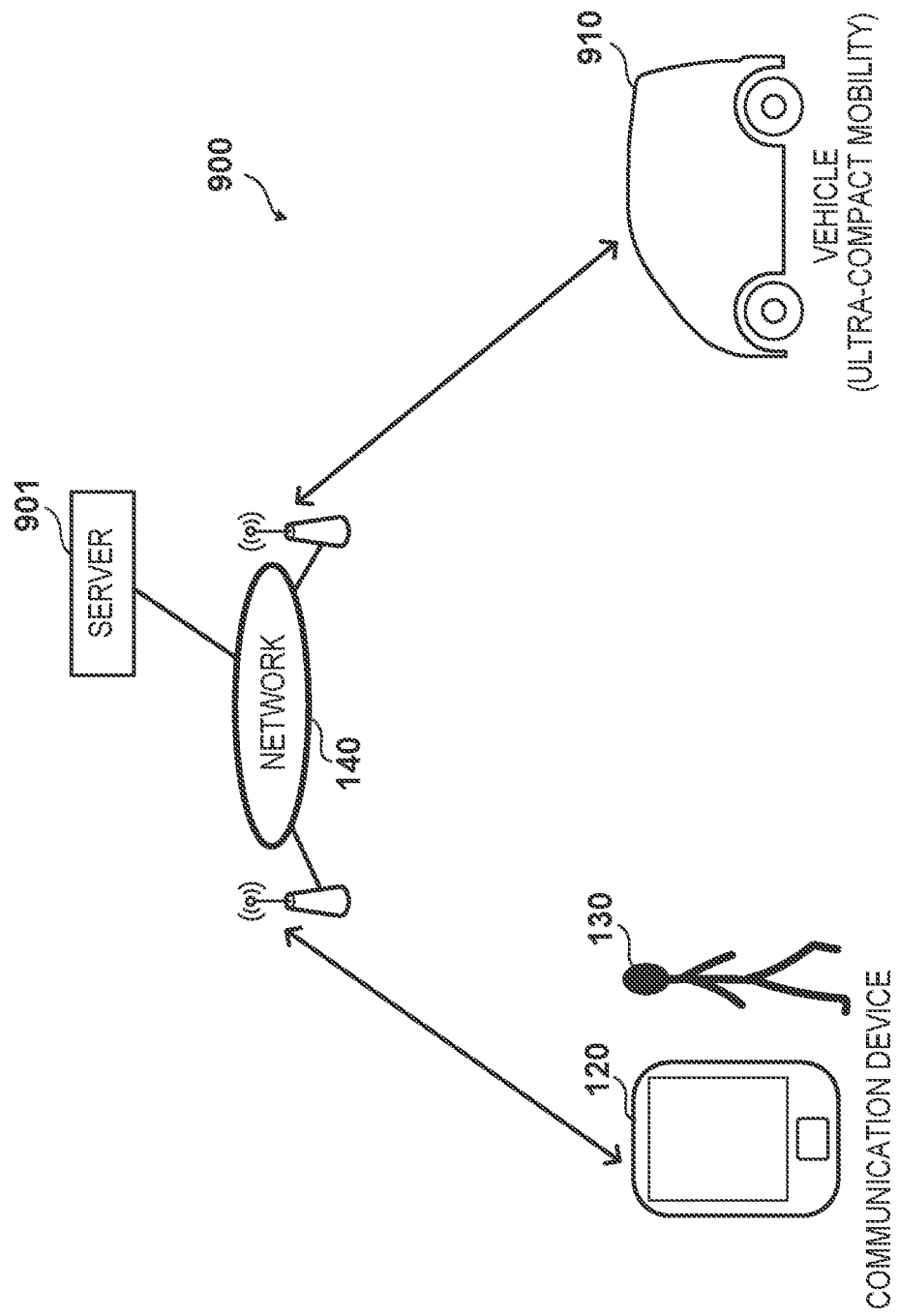

MOBILE BODY CONTROL DEVICE, MOBILE BODY CONTROL METHOD, MOBILE BODY, INFORMATION PROCESSING METHOD, AND STORAGE MEDIUM

CROSS-REFERENCE TO RELATED APPLICATION(S)

This application claims priority to and the benefit of Japanese Patent Application No. 2022-040719 filed on Mar. 15, 2022, the entire disclosure of which is incorporated herein by reference.

BACKGROUND OF THE INVENTION

Field of the Invention

The present invention relates to a mobile body control device, a mobile body control method, a mobile body, an information processing method, and a non-transitory computer-readable storage medium.

Description of the Related Art

In recent years, an electric vehicle called an ultra-compact mobility vehicle (also referred to as a micro mobility vehicle) having a riding capacity of about one or two persons is known, and is expected to spread as an easy movement mechanism.

In order to use the ultra-compact mobility vehicle that travels by automated driving as an easy movement mechanism, it is desirable that the ultra-compact mobility vehicle stops at a suitable location where a user can easily ride. Japanese Patent Laid-Open No. 2019-91216 discloses a technique in which, when the user coming out of a house is allowed to ride in an automated driving vehicle, a distance for the user to walk to a riding position is made as short as possible to prevent the user from feeling inconvenience. Japanese Patent Laid-Open No. 2020-142720 discloses a technique in which when it is recognized that an occupant of a self-vehicle is present in a boarding and alighting area, a vehicle traveling by automated driving determines a stop position at a position where a distance between the self-vehicle and the occupant is within several meters in the boarding and alighting area and travels to the stop position.

Incidentally, in a case where the user uses the ultra-compact mobility vehicle, a use case is conceivable in which the ultra-compact mobility vehicle and the user dynamically adjust the stop position of the mobility vehicle while moving. Although such a use case is effective in a case where merging at a scheduled position becomes difficult due to congestion, regulation, and the like, a case where the stop position is finely adjusted, and other cases, when the mobility cannot detect the stop position at the time of merging, there is a possibility that traveling cannot be continued and the vehicle stops. In the above-described prior art, a use case in which the stop position of the vehicle is dynamically adjusted while the vehicle and the user are both moving has not been considered.

SUMMARY OF THE INVENTION

The present invention has been made in view of the above problems, and an object of the present invention is to realize a technology capable of reducing occurrence of stop of a mobile body when the mobile body travels to a stop position adjusted by a user and the mobile body (such as a vehicle).

In order to solve the aforementioned issues, one aspect of the present disclosure provides a mobile body control device that adjusts a stop position of the mobile body based on an instruction of a user, the mobile body control device comprising: an instruction acquisition unit configured to acquire, from a communication device used by a user, instruction information for designating a predetermined target; an image acquisition unit configured to acquire a captured image captured in the mobile body; a determination unit configured to determine a position of the predetermined target from the mobile body as a stop position based on a region of the predetermined target identified in the captured image; and a control unit configured to control traveling of the mobile body in such a way that the mobile body travels toward the determined stop position, wherein in a case where the predetermined target is not identified in the captured image while the mobile body is traveling toward the stop position, the control unit updates the stop position determined with respect to the predetermined target according to a motion of the mobile body to control the traveling of the mobile body to the stop position.

Another aspect of the present disclosure provides a mobile body control method of adjusting a stop position of the mobile body based on an instruction of a user, the mobile body control method comprising: acquiring, from a communication device used by a user, instruction information for designating a predetermined target; acquiring a captured image captured in the mobile body; determining a position of the predetermined target from the mobile body as a stop position based on a region of the predetermined target identified in the captured image; and controlling traveling of the mobile body in such a way that the mobile body travels toward the determined stop position, wherein in a case where the predetermined target is not identified in the captured image while the mobile body is traveling toward the stop position, the controlling includes updating the stop position determined with respect to the predetermined target according to a motion of the mobile body to control the traveling of the mobile body to the stop position.

Still another aspect of the present disclosure provides a mobile body that adjusts a stop position based on an instruction of a user, the mobile body comprising: an instruction acquisition unit configured to acquire, from a communication device used by a user, instruction information for designating a predetermined target; an image acquisition unit configured to acquire a captured image captured in the mobile body; a determination unit configured to determine a position of the predetermined target from the mobile body as a stop position based on a region of the predetermined target identified in the captured image; and a control unit configured to control traveling of the mobile body in such a way that the mobile body travels toward the determined stop position, wherein in a case where the predetermined target is not identified in the captured image while the mobile body is traveling toward the stop position, the control unit updates the stop position determined with respect to the predetermined target according to a motion of the mobile body to control the traveling of the mobile body to the stop position.

Yet another aspect of the present disclosure provides an information processing method executed by an information processing apparatus that adjusts a stop position of a mobile body based on an instruction of a user, the information processing method comprising: acquiring, from a communication device used by a user, instruction information for designating a predetermined target; acquiring, from the mobile body, a captured image captured in the mobile body and information related to a motion of the mobile body; determining a position of the predetermined target from the mobile body as a stop position based on a region of the predetermined target identified in the captured image; and transmitting, to the mobile body, a control command for controlling traveling of the mobile body in such a way that the mobile body travels toward the determined stop position, wherein in a case where the predetermined target is not identified in the captured image while the mobile body is traveling toward the stop position, the controlling includes updating the stop position determined with respect to the predetermined target according to the motion of the mobile body to control the traveling of the mobile body to the stop position.

Still yet another aspect of the present disclosure provides a non-transitory computer-readable storage medium that stores a program for causing a computer to function as each unit of a mobile body control device that adjusts a stop position of a mobile body based on an instruction of a user, the mobile body control device including: an instruction acquisition unit configured to acquire, from a communication device used by the user, instruction information for designating a predetermined target; an image acquisition unit configured to acquire a captured image captured in the mobile body; a determination unit configured to determine a stop position, which is a relative position of the predetermined target measured from the mobile body, where a region of the predetermined target has been identified in the captured image; and a control unit configured to control traveling of the mobile body in such a way that the mobile body travels toward the determined stop position, wherein, when the predetermined target cannot be identified in the captured image when the mobile body is traveling toward the stop position, the control unit updates the stop position determined for the predetermined target in accordance with the movement of the mobile body, thereby controlling traveling of the mobile body toward the stop position.

Further features of the present invention will become apparent from the following description of exemplary embodiments (with reference to the attached drawings).

BRIEF DESCRIPTION OF THE DRAWINGS

FIG. 1 is a diagram illustrating an example of an information processing system according to an embodiment of the present invention;

FIG. 5G is a diagram (7) illustrating determination of the stop position of the vehicle using the utterance and the image according to the present embodiment;

FIG. 9 is a diagram illustrating an example of an information processing system according to another embodiment.

DESCRIPTION OF THE EMBODIMENTS

Figure 2A:
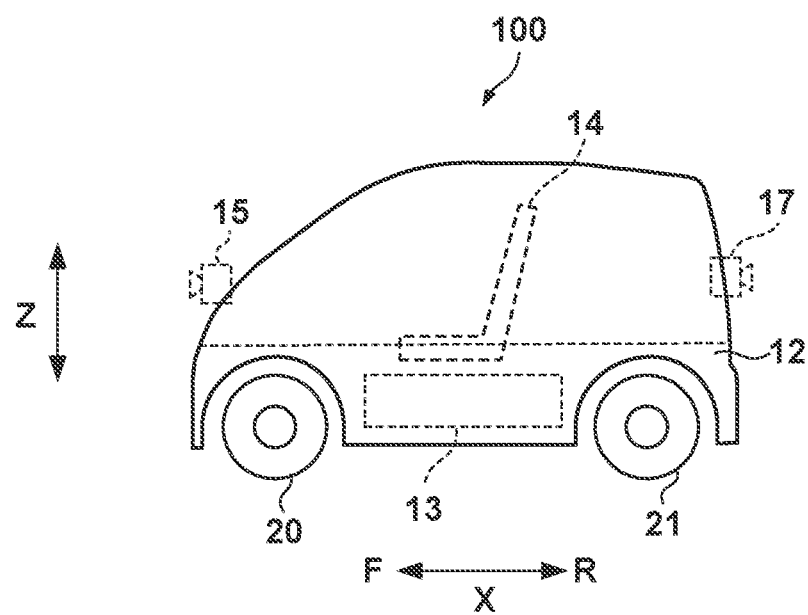
FIGS. 2A and 2B are block diagrams illustrating a hardware configuration example of a vehicle according to the present embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

(Configuration of Information Processing System)

A configuration of an information processing system 10 according to the present embodiment will be described with reference to FIG. 1. The information processing system 10 includes a vehicle 100 and a communication device 120.

The vehicle 100 is an example of a mobile body, and is, for example, an ultra-compact mobility vehicle that is equipped with a battery and moves mainly by the power of a motor. The ultra-compact mobility vehicle is an ultra-compact vehicle that is more compact than a general automobile and has a riding capacity of about one or two persons. The ultra-compact mobility vehicle may be able to travel on roadways or sidewalks. In the present embodiment, the vehicle 100 is, for example, a four-wheeled vehicle. The present embodiment is applicable not only to vehicles but also to other mobile bodies. The mobile body is not limited to the vehicle, and may include a small mobility such as traveling in parallel with a walking user to carry baggage or lead a person, or may include another mobile body (such as a walking robot) capable of autonomous movement.

The vehicle 100 is connected to a network 140 via wireless communication such as 5th generation mobile communication, road-to-vehicle communication, or Wi-Fi. The vehicle 100 measures states inside and outside the vehicle (such as a vehicle position, a traveling state, or a target of a surrounding object) by various sensors and accumulates measured data. The data collected and transmitted as described above is also generally referred to as floating data, probe data, traffic information, or the like. The vehicle 100 may transmit the accumulated data to a server (not illustrated). When information on the vehicle is transmitted to the server, the information is transmitted at regular intervals or in response to an occurrence of a specific event. The vehicle 100 can travel by automated driving even when a user 130 does not board the vehicle. The vehicle 100 can start traveling from a first stop position toward a position where the user 130 boards the vehicle in accordance with utterance information from the communication device 120 or the like. As will be described later, the vehicle 100 acquires the utterance information of the user transmitted from the communication device 120 via a network 140 and transmits the utterance information to the communication device 120 to adjust the stop position with the user. The vehicle 100 stops the vehicle at the adjusted stop position to allow the user to board the vehicle.

The communication device 120 is, for example, a smartphone, but is not limited thereto, and may be an earphone type communication terminal, a personal computer, a tablet terminal, a game machine, or the like. The communication device 120 is connected to the network 140 via wireless communication such as 5th generation mobile communication or Wi-Fi.

The network 140 includes, for example, a communication network such as the Internet or a mobile phone network, and transmits information between the vehicle 100, the communication device 120, a server (not illustrated), and the like.

In the information processing system 10, in a case where the user 130 and the vehicle 100 at distant locations approach each other to such an extent that a target or the like (serving as a visual mark) can be visually confirmed, the stop position is adjusted using the utterance information and image information captured by the vehicle 100.

Before the user 130 and the vehicle 100 approach each other to the extent that the target or the like can be visually confirmed, first, the vehicle 100 moves a current position of the user on a map or a position of a destination obtained from the utterance information of the user on the map as the stop position. Then, when the vehicle 100 approaches the stop position, the user is identified, or the utterance information (for example, "Is there a store nearby?") asking for a location related to the visual mark is transmitted to the communication device 120. As a result, the vehicle 100 can move toward the position of the user in a case where the user can be found (identified) from the image information, or can move toward a mark obtained from the utterance information even in a situation where it is difficult to identify the user.

The place related to the visual mark includes, for example, a name of a target that can be identified from an image. The vehicle 100 receives, from the communication device 120, the utterance information (e.g., "Stop in front of the vending machine") including a location related to a visual mark. Then, the vehicle 100 identifies the target as the mark from the image information and moves to the front of a location of the mark.

(Configuration of Vehicle)

Next, a configuration of the vehicle 100 as an example of the vehicle according to the present embodiment will be described with reference to FIGS. 2A and 2B.

Figure 2B:
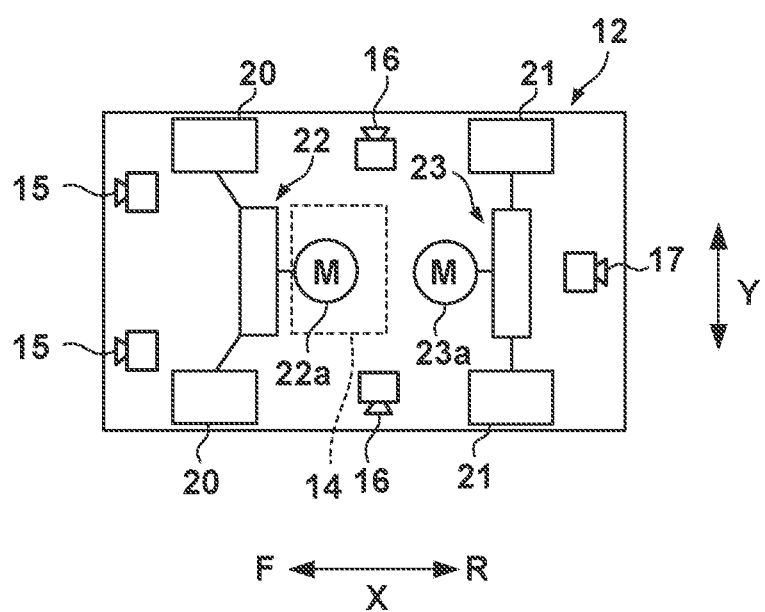

FIG. 2A illustrates a side surface of the vehicle 100 according to the present embodiment, and FIG. 2B illustrates an internal configuration of the vehicle 100. In the drawings, an arrow X indicates a front-and-rear direction of the vehicle 100, F indicates the front, and R indicates the rear. Arrows Y and Z indicate a width direction (lateral direction) and a vertical direction of the vehicle 100, respectively.

The vehicle 100 is an electric autonomous vehicle including a traveling unit 12 and using a battery 13 as a main power supply. The battery 13 is, for example, a secondary battery such as a lithium ion battery, and the vehicle 100 autonomously travels by the traveling unit 12 by electric power supplied from the battery 13. The traveling unit 12 is, for example, a four-wheeled vehicle including a pair of left and right front wheels 20 and a pair of left and right rear wheels 21. The traveling unit 12 may be in another form such as a form of a three-wheeled vehicle. The vehicle 100 includes a seat 14 for one person or two persons.

The traveling unit 12 includes a steering mechanism 22. The steering mechanism 22 is a mechanism that changes a steering angle of the pair of front wheels 20 using a motor 22a as a driving source. The traveling direction of the vehicle 100 can be changed by changing the steering angle of the pair of front wheels 20. The traveling unit 12 further includes a driving mechanism 23. The driving mechanism 23 is a mechanism that rotates the pair of rear wheels 21 using a motor 23a as a driving source. The vehicle 100 can be moved forward or backward by rotating the pair of rear wheels 21. The traveling unit 12 can detect and output physical quantities representing motions of the vehicle 100, such as the traveling speed, acceleration, and steering angle of the vehicle 100, and a rotational acceleration of a body of the vehicle 100.

The vehicle 100 includes detection units 15 to 17 that detect targets around the vehicle 100. The detection units 15 to 17 are a group of external sensors that monitors the surroundings of the vehicle 100, and in the case of the present embodiment, each of the detection units 15 to 17 is an imaging device that captures an image of the surroundings of the vehicle 100 and includes, for example, an optical system such as a lens and an image sensor. In the vehicle 100, in addition to the imaging device, a radar or a light detection and ranging (LiDAR) can also be used. The vehicle 100 can acquire a position (hereinafter, referred to as relative position) of a specific person or a specific target viewed from the coordinate system of vehicle 100 based on the image information obtained by the detection unit. The relative position can be indicated as, for example, a position of 1 m on the left and a position of 10 m in front.

The two detection units 15 are arranged on front portions of the vehicle 100 in a state of being spaced apart from each other in a Y direction, and mainly detect targets in front of the vehicle 100. The detection units 16 are arranged on a left side portion and a right side portion of the vehicle 100, respectively, and mainly detect targets on sides of the vehicle 100. The detection unit 17 is disposed on a rear portion of the vehicle 100, and mainly detects targets behind the vehicle 100.

Figure 3:
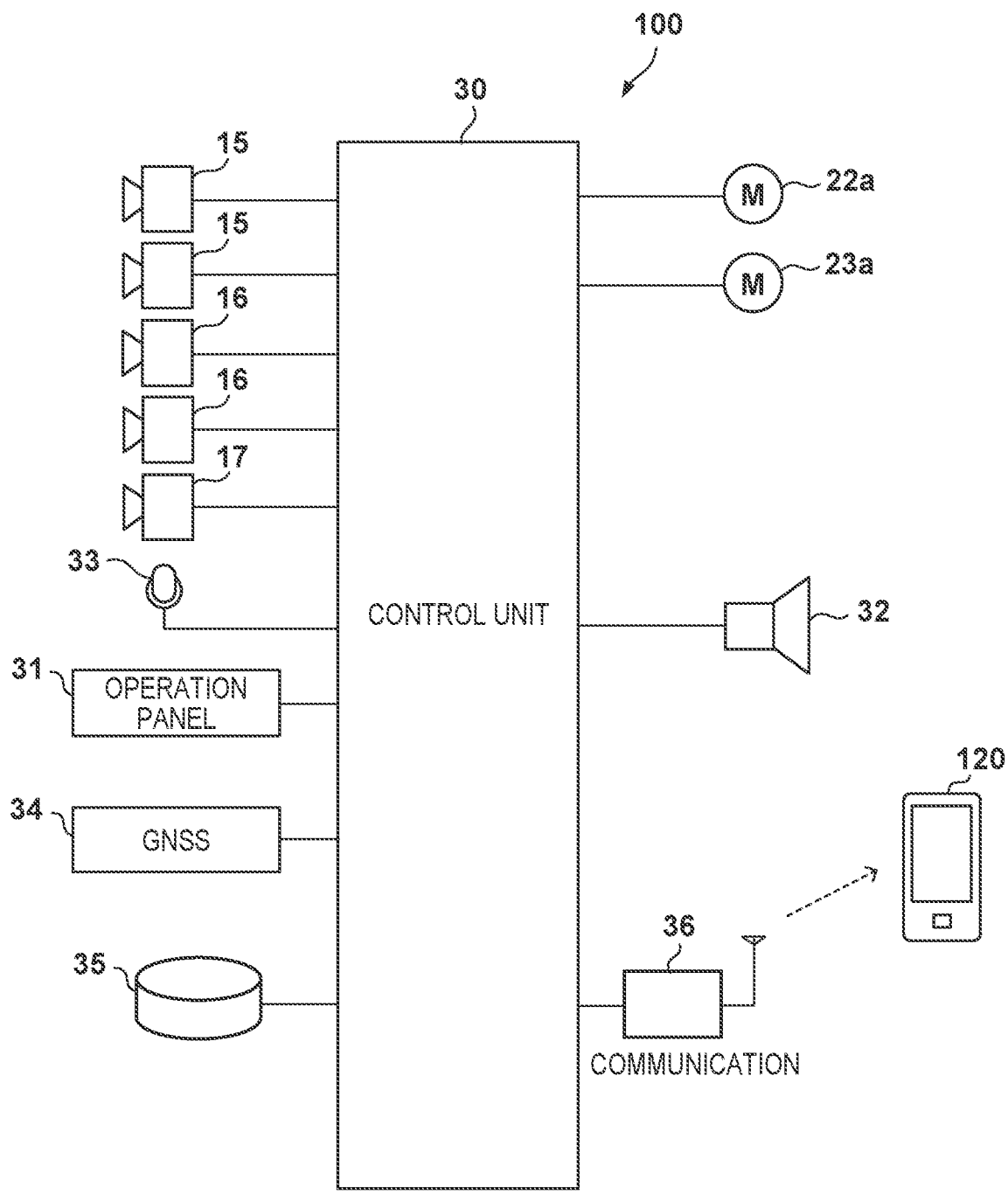
FIG. 3 is a block diagram illustrating a functional configuration example of the vehicle according to the present embodiment.

FIG. 3 is a block diagram of a control system of the vehicle 100. The vehicle 100 includes a control unit (ECU) 30. The control unit 30 functions as a control device of the vehicle (mobile body). The control unit 30 includes a processor represented by a central processing unit (CPU), a storage device such as a semiconductor memory, an interface with an external device, and the like. In the storage device, programs executed by the processor, data used for processing by the processor, and the like are stored. A plurality of sets of processors, storage devices, and interfaces may be provided for each function of the vehicle 100 so as to be able to communicate with each other.

The control unit 30 acquires detection results of the detection units 15 to 17, input information of an operation panel 31, voice information input from a voice input device 33, the utterance information from the communication device 120, and the like to execute corresponding processing. The control unit 30 performs control of the motors 22a and 23a (traveling control of the traveling unit 12), display control of the operation panel 31, notification to an occupant of the vehicle 100 by voice, and output of information. In addition to the CPU, the control unit 30 may further include, as a processor, a graphical processing unit (GPU) or dedicated hardware suitable for executing processing of a machine learning model such as a neural network. In addition, the control unit 30 executes stop-position determination processing according to the present embodiment described later.

The voice input device 33 can collect a voice of the occupant of the vehicle 100. The control unit 30 can recognize the input voice and execute corresponding processing. A global navigation satellite system (GNSS) sensor 34 receives a GNSS signal and detects a current position of the vehicle 100.

A storage device 35 is a mass storage device that stores map data and the like including information regarding a traveling road on which the vehicle 100 can travel, landmarks such as buildings, stores, and the like. In the storage device 35, programs executed by the processor, data used for processing by the processor, and the like may be stored. The storage device 35 may store various parameters (for example, learned parameters of a deep neural network, hyperparameters, and the like) of a machine learning model for voice recognition or image recognition executed by the control unit 30. Furthermore, the storage device 35 may be provided on a server (not illustrated).

The communication device 36 is, for example, a communication device that can be connected to the network 140 via wireless communication such as 5th generation mobile communication or Wi-Fi.

(Software Configuration for Stop-Position Determination Processing)

Figure 4:
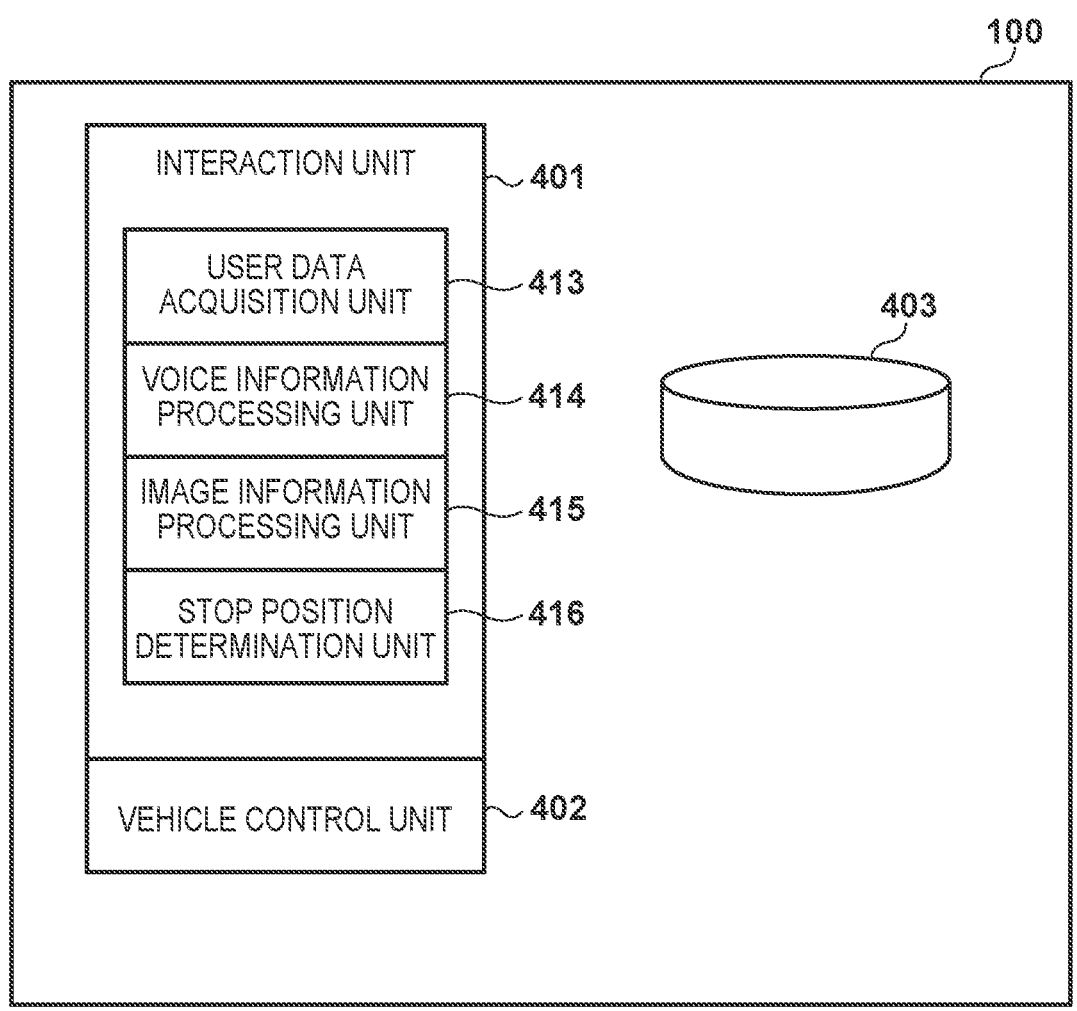
FIG. 4 is a block diagram illustrating an example of a functional configuration implemented by a control unit according to the present embodiment.

Next, a software configuration for the stop-position determination processing in the control unit 30 will be described with reference to FIG. 4. The present software configuration is implemented by the control unit 30 executing a program stored in a non-transitory computer-readable storage medium.

The software configuration according to the present embodiment includes an interaction unit 401, a vehicle control unit 402, and a database 403. The interaction unit 401 performs processing for voice information (utterance information) exchanged with the communication device 120, processing for the image information acquired by the detection unit 15 or the like, processing for estimating the stop position, and other processing.

The vehicle control unit 402, for example, determines a route to the stop position set by the interaction unit 401, and controls each unit of the vehicle along the route. Although details will be described later, when the vehicle 100 approaches the stop position during traveling using the relative position, the vehicle control unit 402 controls the traveling speed according to a remaining distance. For example, when the remaining distance to the stop position is larger than a predetermined value, the vehicle control unit 402 controls the vehicle to approach the stop position at a predetermined (relatively fast) first speed. When the remaining distance is equal to or less than the predetermined value, the vehicle control unit 402 controls the vehicle to approach the stop position at a second speed (first speed>second speed) at which the stop control can be quickly performed by safe acceleration/deceleration.

The database 403 stores various data such as the map data including the information regarding the traveling road on which the vehicle 100 can travel, the landmarks such as buildings, the stores, and the like described above, and travel history information of the self-vehicle and other vehicles described above.

A user data acquisition unit 413 acquires the utterance information and position information transmitted from the communication device 120. The user data acquisition unit 413 may store the acquired utterance information and position information in a database 403. As will be described later, the utterance information acquired by the user data acquisition unit 413 is input to a learned machine learning model in order to estimate the user's intention. In the following description, a case where a user's instruction is acquired based on the utterance information will be described as an example. However, information (instruction information) including the user's instruction is not limited to voice information, and may be other information including the user's intention such as text information.

A voice information processing unit 414 includes a machine learning model that processes voice information, and executes or processing of an inference stage of the machine learning model. The machine learning model of the voice information processing unit 414 recognizes utterance content of the user and estimates utterance intention of the user by performing computation of a deep learning algorithm using a deep neural network (DNN), for example. A machine learning algorithm separate from the recognition of the utterance content of the user and the estimation of the intention of the user may be used.

The estimation of the intention of the user may be classification processing of classifying the utterance information into a predetermined intention class. The utterance intention class may be defined for each use scene (for example, before boarding, during boarding, and after alighting) in which the user 130 uses the vehicle 100. By defining the intention class for each use scene, the number of classifications in intention recognition is limited, and recognition accuracy can be improved. For example, intention classes such as an inquiry, a pick-up request, a greeting, a destination instruction, a mark expression, agreement, denial, and asking back may be associated with the use scene of "before boarding". Further, for example, intention classes that are at least partially different from those before boarding, such as a route instruction, a stop instruction, an acceleration instruction, a deceleration instruction, agreement, denial, and asking back may be associated with the use scene of "during boarding". Similarly, intention classes that are at least partially different from those before boarding and those during boarding may be associated with the use scene "after boarding". As an example of estimation of the intention class, an utterance such as "Can you ride now?" at a stage before boarding is classified into the intention of "inquiry". Furthermore, an utterance such as "Can you come soon?" is classified into the intention of "pick-up request".

In addition, the utterance information such as "in front of the vending machine" is classified into the intention of "mark expression".

In the recognition of the utterance content of the user, for example, when the utterance intention of the user is the destination instruction, a place name or the like included in the utterance information may be identified. In the recognition of the utterance content of the user, for example, a place name, a name of a landmark such as a building, a store name, a target name, and the like included in the utterance information are recognized. The target may include a pedestrian, a signboard, a sign, equipment installed outdoors such as a vending machine, building components such as a window and an entrance, a road, a vehicle, a two-wheeled vehicle, and the like included in the utterance information.

The DNN becomes a learned state by performing the processing of the learning stage, and can perform recognition processing (processing of the inference stage) for utterance information by inputting the utterance information to the learned DNN. Note that, in the present embodiment, a case where the vehicle 100 executes voice recognition processing will be described as an example, but the voice recognition processing may be executed by a server (not illustrated), and a recognition result may be received from the server.

An image information processing unit 415 includes a machine learning model that processes image information, and the learned machine learning model executes processing of an inference stage. The machine learning model of the image information processing unit 415 performs processing of recognizing a target included in image information by performing computation of a deep learning algorithm using a deep neural network (DNN), for example. The target may include a pedestrian, a signboard, a sign, equipment installed outdoors such as a vending machine, building components such as a window and an entrance, a road, a vehicle, a two-wheeled vehicle, and the like included in the image. In addition, the machine learning model of the image information processing unit 415 can recognize the face of the person, the action (for example, hand gesture) of the person, the shape of the clothes, the color of the clothes, and the like included in the image information.

A stop-position determination unit 416 cooperates with the voice information processing unit 414 and the image information processing unit 415 described above to execute an operation of stop-position determination processing described later. The stop-position determination processing will be described later.

(Outline of Stop-Position Determination Processing)

An outline of the stop-position determination processing executed in the vehicle 100 will be described with reference to FIGS. 5A to 5H. An operation described with the vehicle 100 as an operation subject in this description is realized by the control unit 30 of the vehicle 100 executing a program and each unit illustrated in FIG. 4 operating.

In the stop-position determination processing, when there is a pick-up request from the user, first, the user 130 and the vehicle 100 located at a distant location approach each other to such an extent that the user, the target serving as a mark, or the like can be visually confirmed. Thereafter, the vehicle 100 adjusts the stop position with the user 130 based on the voice information (utterance information) and the image information, and stops at a desired position of the user 130. The reason why the stop position can be adjusted in this manner is that the possibility that the user corrects the stop position once determined according to the surrounding situation is considered. Even in a case where there is a possibility that accuracy of voice recognition or image recognition fluctuates according to the surrounding environment such as a state of noise or light, it is possible to easily cope with the case by making the stop position adjustable. As will be described later, in the present embodiment, it is possible to adjust a new stop position while the vehicle 100 moves to a currently set stop position or is stopped, and it is possible to smoothly join at the new stop position.

Figure 5A:
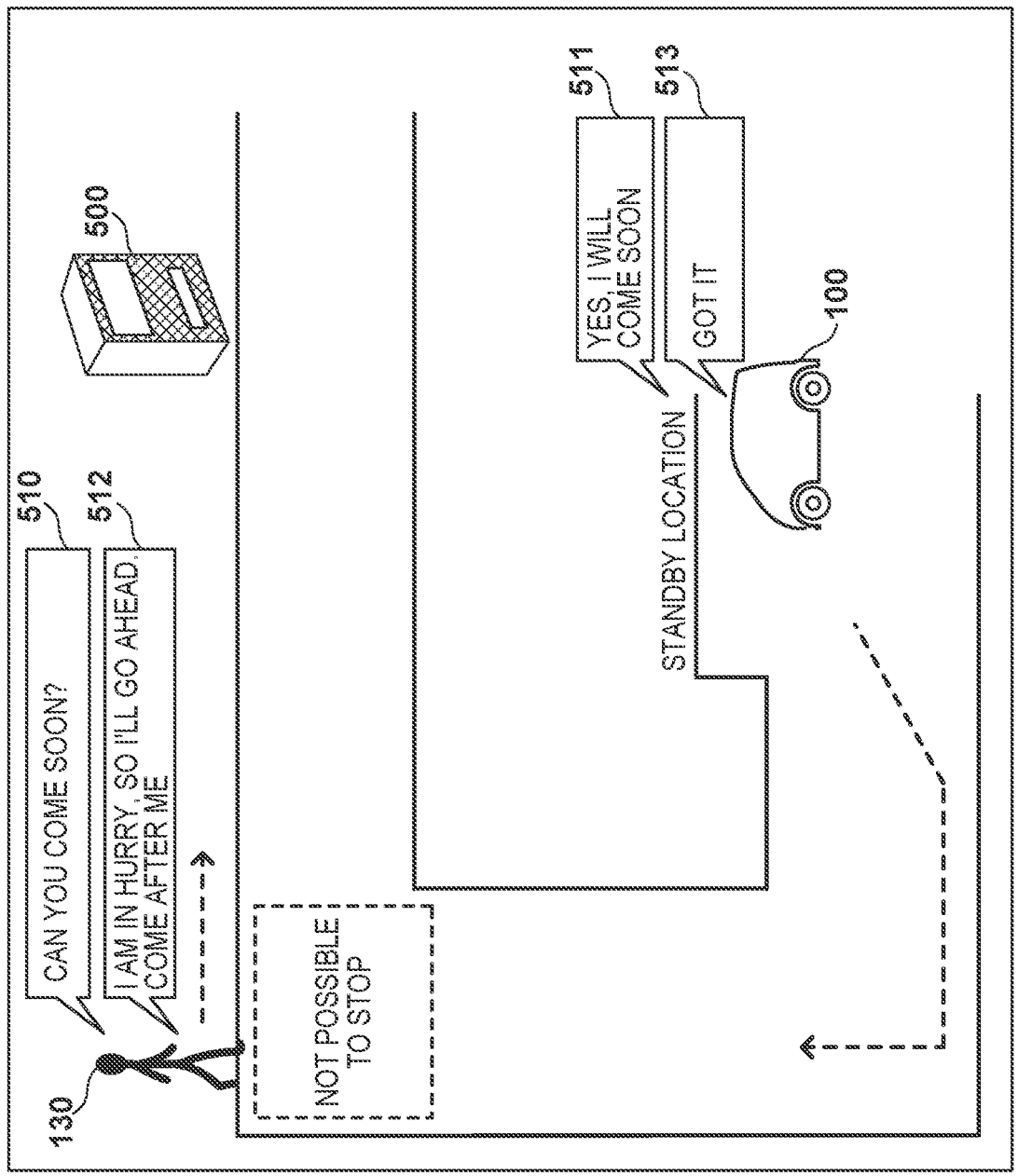
FIG. 5A is a diagram (1) illustrating determination of a stop position of the vehicle using an utterance and an image according to the present embodiment.

FIG. 5A schematically illustrates a state where the user 130 calls the vehicle 100 stopped at a standby location by utterance in an area where the vehicle 100 can travel. First, the user 130 transmits utterance information 510 of "Can you come soon?" to the vehicle 100 using the communication device 120. When the vehicle 100 acquires the utterance information of the user 130 and determines that the utterance intention of the utterance information is "pick-up request", the vehicle 100 transmits utterance information 511 of "Yes, I will come soon" to the communication device 120. In the vicinity of the current position of the user 130, for example, there is a region where the vehicle cannot be stopped. The user 130 wants to get in the vehicle 100 while moving toward a vending machine 500 ahead in a moving direction. Thus, the user 130 transmits utterance information 512 of "I am in a hurry, so I'll go ahead. Come after me" from the communication device 120 to the vehicle 100. When the vehicle 100 receives the utterance information 512 and recognizes the utterance intention and content, the vehicle 100 transmits utterance information 513 of "Got it" to the communication device 120. At this time, since designation of the destination is not included in the utterance information of the user, the vehicle 100 acquires the position information (for example, GPS information) of the communication device 120 of the user 130 and sets the stop position based on the position of the user 130 and the map information. Then, the vehicle 100 calculates a route through which the vehicle moves to the stop position (the position of the user 130 at the present time) from the map information, and moves according to the route.

Figure 5B:
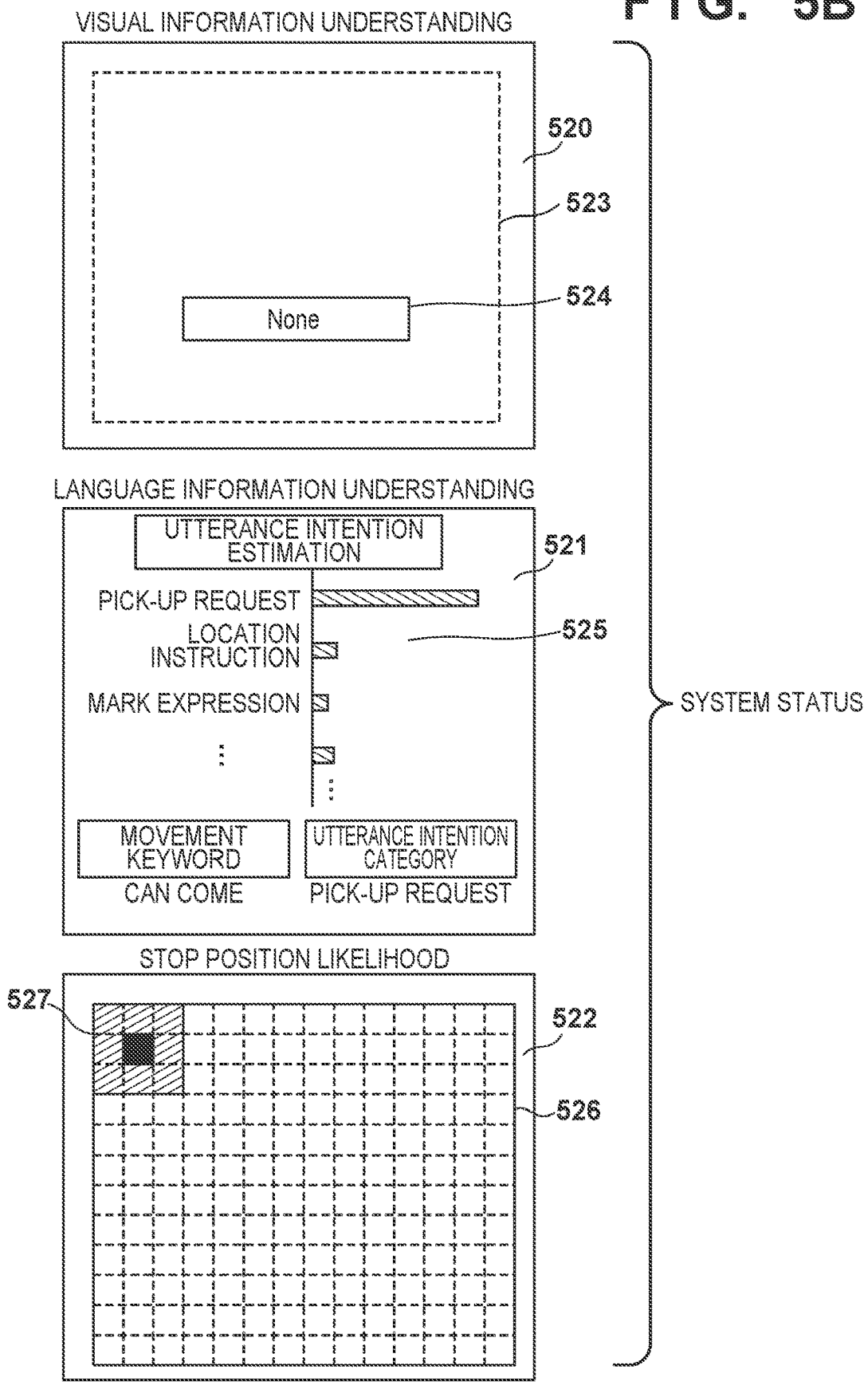
FIG. 5B is a diagram (2) illustrating determination of the stop position of the vehicle using the utterance and the image according to the present embodiment.

FIG. 5B schematically illustrates an example of a system status after the vehicle 100 acquires the utterance information 510 of "Can you come soon?" and performs the voice information processing and the like. As an example, the system status is indicated by visual information understanding 520 indicating a processing result of visual information, language information understanding 521 indicating a processing result of the utterance information, and likelihood 522 of an estimated stop position.

In the visual information understanding 520, a display 524 of a recognized target is displayed in captured image information 523. In the present description, information on a subject irrelevant to the description is omitted in order to ensure drawing legibility. Thus, in the example illustrated in FIG. 5B, nothing is described in the image information 523; however, there is actually a subject or the like of a photographed background. In the example illustrated in FIG. 5B, "None" indicating that the target is not recognized is superimposed.

In the language information understanding 521, an utterance intention estimation result 525 of the user 130 is illustrated. A horizontal bar graph indicates a probability that the estimated user intention corresponds to a category (pick-up request, location instruction, and the like). This example indicates that there is a high probability that the utterance intention of the utterance information of "Can you come soon?" of the user 130 is the pick-up request.

The likelihood 522 of the stop position is represented by a map 526 obtained by meshing a region illustrated in FIG.

5A, and a color-coded region 527 is a region having a high probability (likelihood) of being estimated as the stop position. A blackened region indicates a region having the highest probability as the stop position. A region represented by hatching indicates a region having the second highest probability.

Figure 5C:
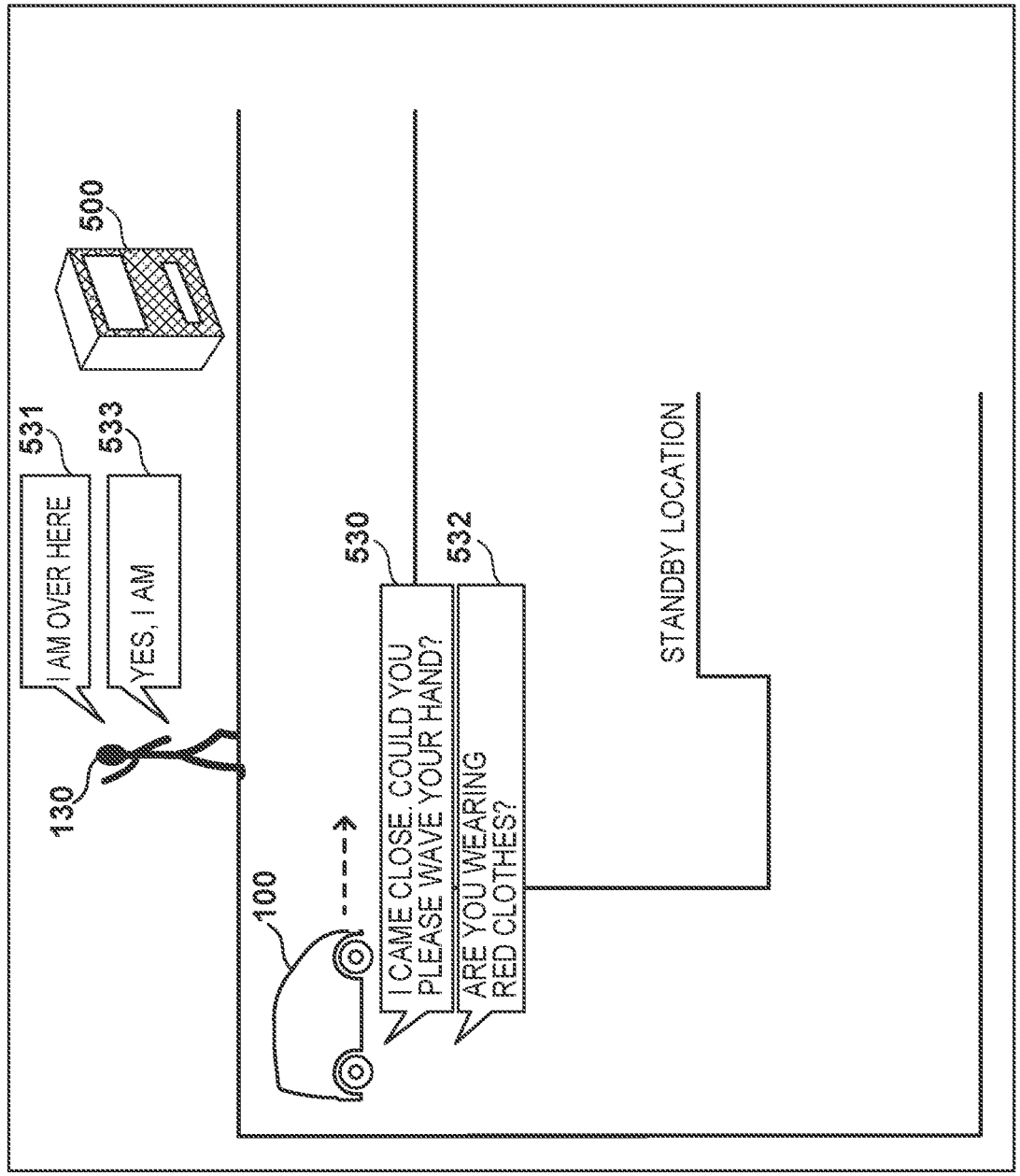
FIG. 5C is a diagram (3) illustrating determination of the stop position of the vehicle using the utterance and the image according to the present embodiment.

FIG. 5C illustrates a situation in which the user has approached to such an extent that the vehicle 100 can confirm the user 130 by the image information. In this situation, the vehicle 100 switches an operation state from a "traveling state based on an absolute position" using the latitude and longitude to a "stop control state based on the relative position" for controlling the stop position using the relative position. Here, the position of the mobile body or the target from a position based on specific geographic coordinates such as latitude and longitude is referred to as an absolute position. Since the relative position is determined using the image information, the vehicle 100 performs an interaction for confirming whether a person in an image is the user 130. For example, the vehicle 100 transmits utterance information 530 of "I am close now. Could you please wave your hand?". The user 130 transmits utterance information 531 of "I am over here" from the communication device 120 to the vehicle 100 while waving his or her hand. The vehicle 100 recognizes the user 130 waving a hand in the image, and transmits, for example, utterance information 532 of "Are you wearing red clothes?" to the communication device 120. In response, the user 130 transmits, from the communication device 120 to the vehicle 100, utterance information 533 indicating an agreement that "Yes, I am".

Figure 5D:
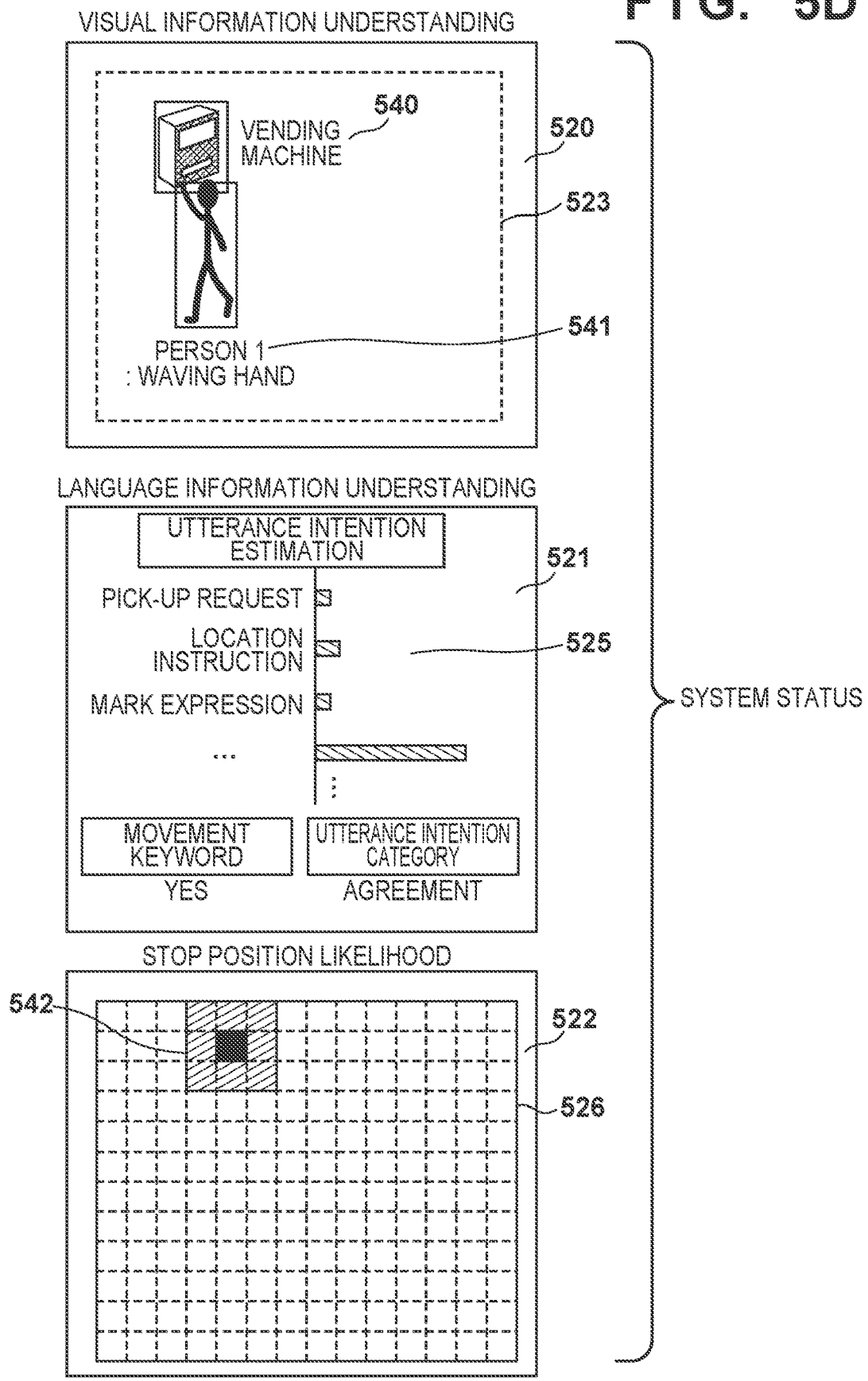
FIG. 5D is a diagram (4) illustrating determination of the stop position of the vehicle using the utterance and the image according to the present embodiment.

FIG. 5D schematically illustrates an example of the system status in a state in which the interaction illustrated in FIG. 5C has progressed between the vehicle 100 and the user 130. The image information 523 indicates a recognition result 541 of recognizing a person waving a hand and a recognition result 540 of recognizing a vending machine as a target. The language information understanding 521 receives the utterance information 533 of "Yes, I am" of the user 130 and indicates the utterance intention estimation result 525 indicating that there is a high probability that the utterance intention is "agreement". In addition, the vehicle 100 calculates the likelihood 522 of the stop position based on the relative position of the user 130 obtained from the recognition result 541 by the image information and the absolute position of the vehicle 100. In this example, since the user 130 has moved, a position of a color-coded region 542 has moved to the right on the map 526.

Figure 5E:
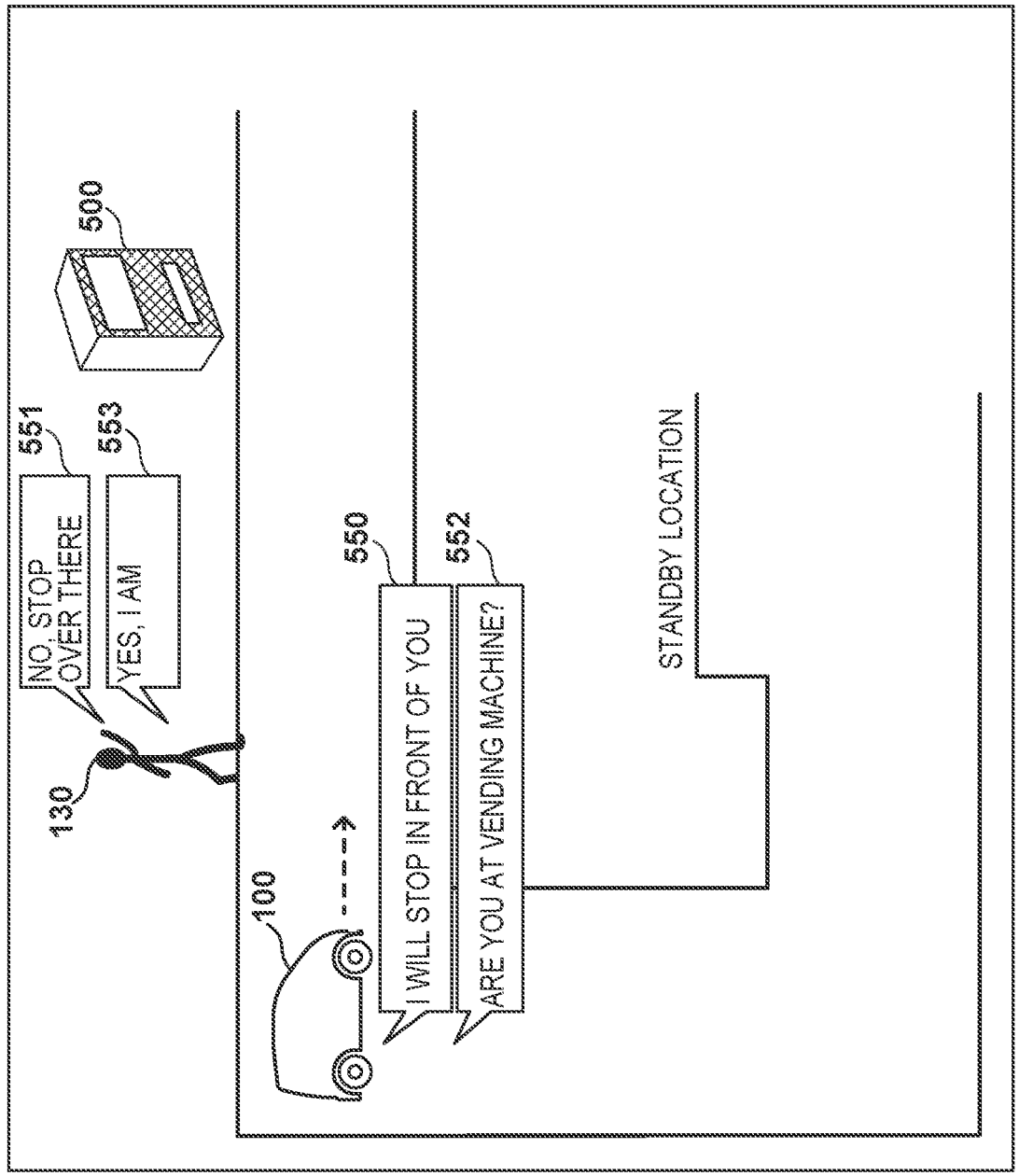
FIG. 5E is a diagram (5) illustrating determination of the stop position of the vehicle using the utterance and the image according to the present embodiment.

FIG. 5E illustrates an interaction example after the vehicle 100 acquires the position of the user 130 at the relative position. The vehicle 100 transmits utterance information 550 of "I will stop in front of you" to the communication device 120. In response, since the user desires to board at another location, the user 130 transmits utterance information 551 of "No, stop over there" to the vehicle 100. At this time, the user 130 points to the vending machine 500. The vehicle 100 recognizes the mark (vending machine) from the image information based on the utterance information 551 (including "over there") and the pointing action of the user 130. Then, the vehicle 100 transmits utterance information 552 of "Are you at the vending machine?" for confirming the mark, and then receives utterance information 553 of "Yes, I am" by the user 130. Through the interaction and the recognition processing, the vehicle 100 sets the position of the vending machine 500 as the stop position, and controls traveling so as to stop at the stop position. As described above, the vehicle 100 can interact with the user 130 while approaching the initially set stop position to search for the stop position, and can flexibly reset a new stop position even when the new stop position is instructed.

Figure 5F:
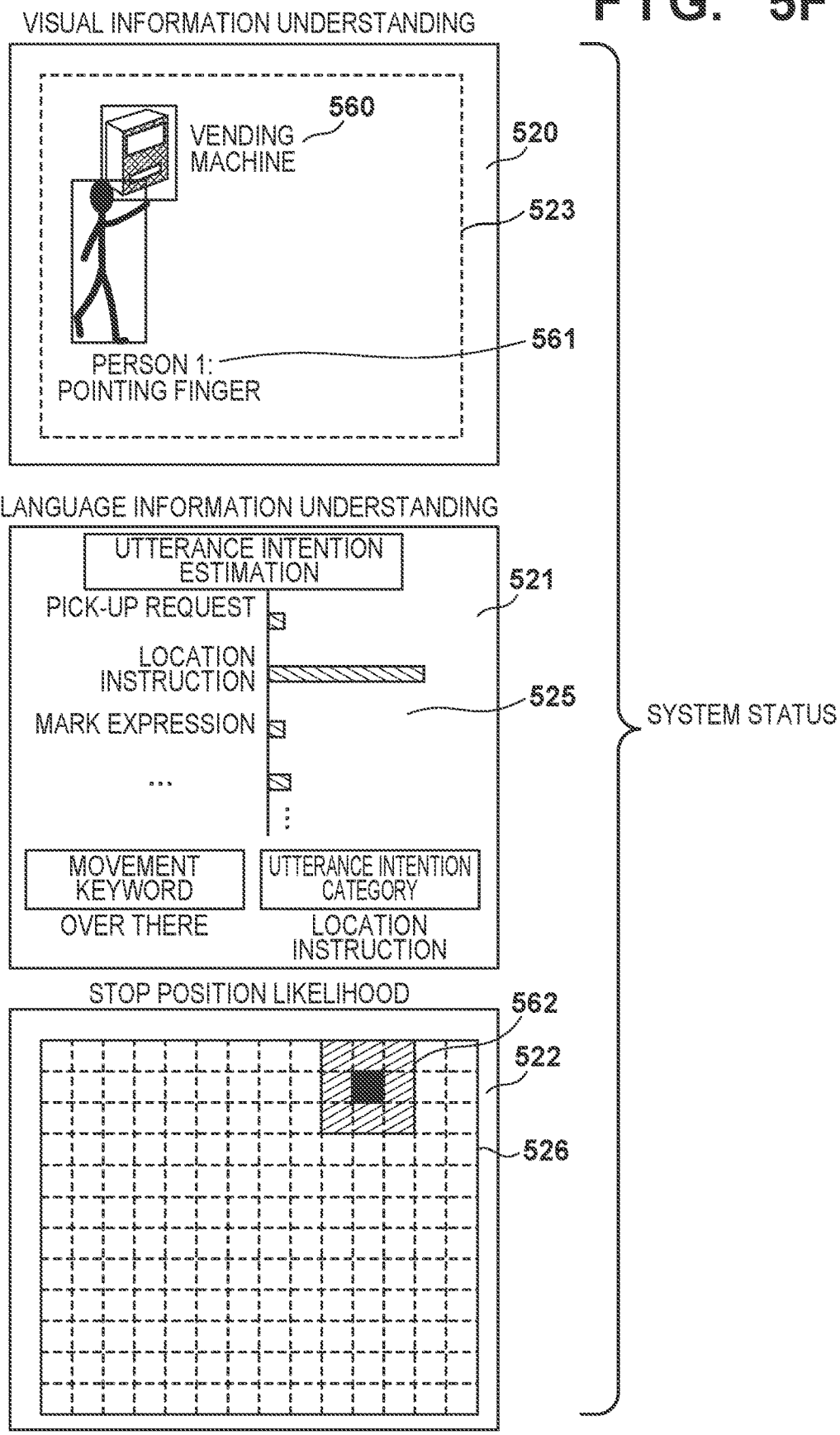
FIG. 5F is a diagram (6) illustrating determination of the stop position of the vehicle using the utterance and the image according to the present embodiment.

FIG. 5F schematically illustrates an example of the system status in a state where the vehicle 100 has processed the utterance information 551 of "No, stop over there" by the user 130. The image information 523 indicates a recognition result 561 of recognizing a person pointing a finger and a recognition result 560 of recognizing a vending machine as a target. The language information understanding 521 receives the utterance information 551 of "No, stop over there" of the user 130 and indicates the utterance intention estimation result 525 indicating that there is a high probability that the utterance intention is "location instruction". In addition, the vehicle 100 calculates the likelihood 522 of the stop position based on the relative position of the vending machine 500 obtained from the recognition results 560 and 561 by the image information and the absolute position of the vehicle 100. In this example, since the position of the vending machine 500 is highly likely to be the stop position, a position of a color-coded region 562 has moved to the right side (position corresponding to the vending machine 500) on the map 526.

FIG. 5G illustrates an example of interaction between the vehicle 100 and the user 130 when the vehicle 100 approaches the position of the vending machine 500. The vehicle 100 travels while continuously measuring the relative position of the vending machine appearing in the image information, and when the vehicle approaches the relative position, the vehicle transmits utterance information 570 of "Sorry to keep you waiting" to the communication device 120. The vehicle 100 stops at the currently set stop position. When the vehicle 100 receives utterance information 571 of "Thank you" by the user 130, the vehicle 100 can determine that allocation is completed (that is, the relative position is not re-designated).

Figure 5H:
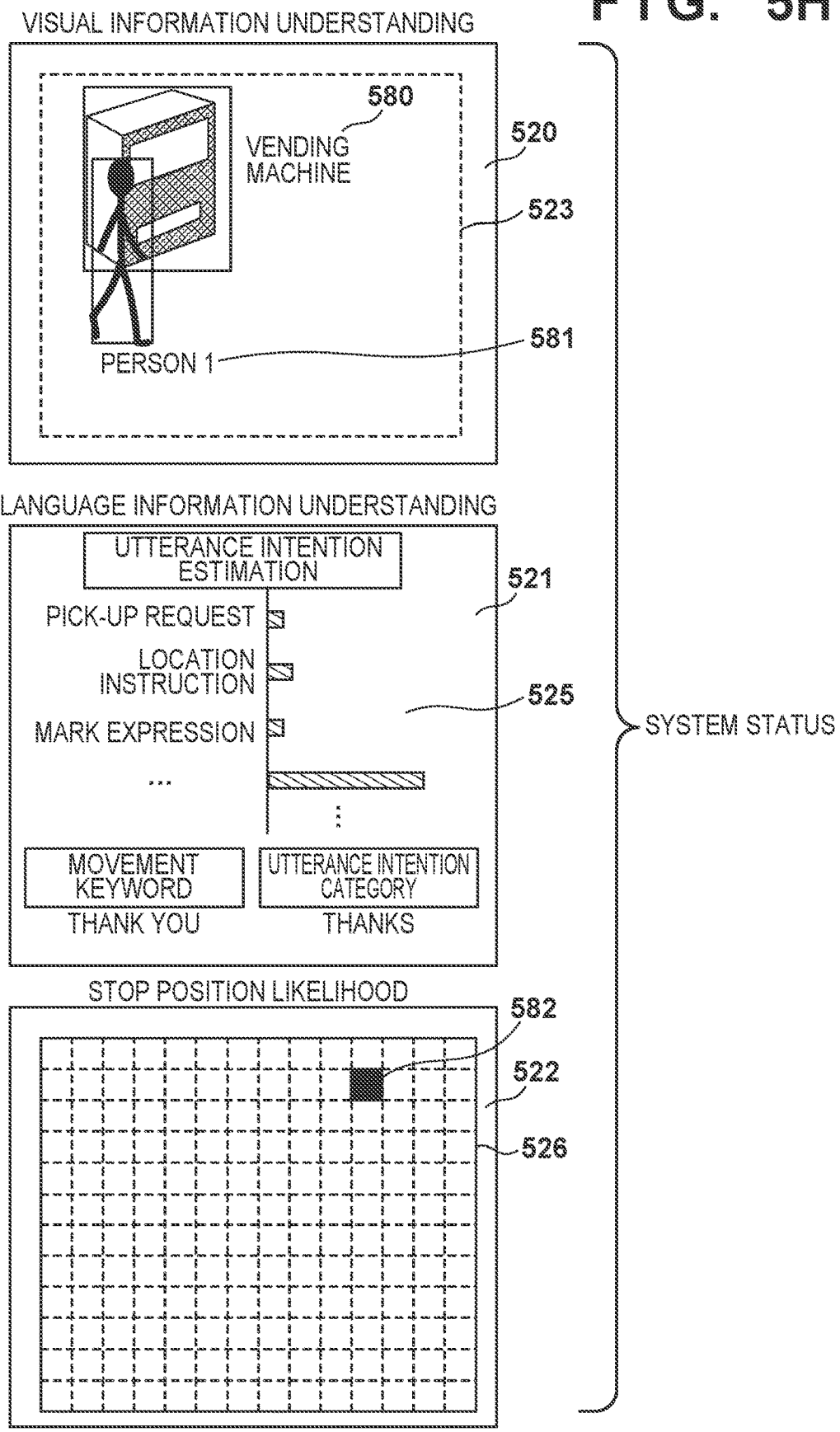
FIG. 5H is a diagram (8) illustrating determination of the stop position of the vehicle using the utterance and the image according to the present embodiment.

FIG. 5H schematically illustrates an example of the system status in a state where the vehicle 100 has processed the utterance information 571 of "Thank you" by the user 130. The image information 523 indicates a recognition result 581 of recognizing a person and a recognition result 580 of recognizing a vending machine as a target. The language information understanding 521 receives the utterance information 571 of "Thank you" of the user 130 and indicates the utterance intention estimation result 525 indicating that there is a high probability that the utterance intention is "thanks". In addition, the vehicle 100 calculates the likelihood 522 of the stop position based on the relative position of the vending machine 500 obtained from the recognition result 580 by the image information and the absolute position of the vehicle 100. In this example, since the position of the vending machine 500 is extremely highly likely to be the stop position, a position of a region 582 indicating the high probability indicates the position corresponding to the vending machine 500 on the map 526.

Figure 6:
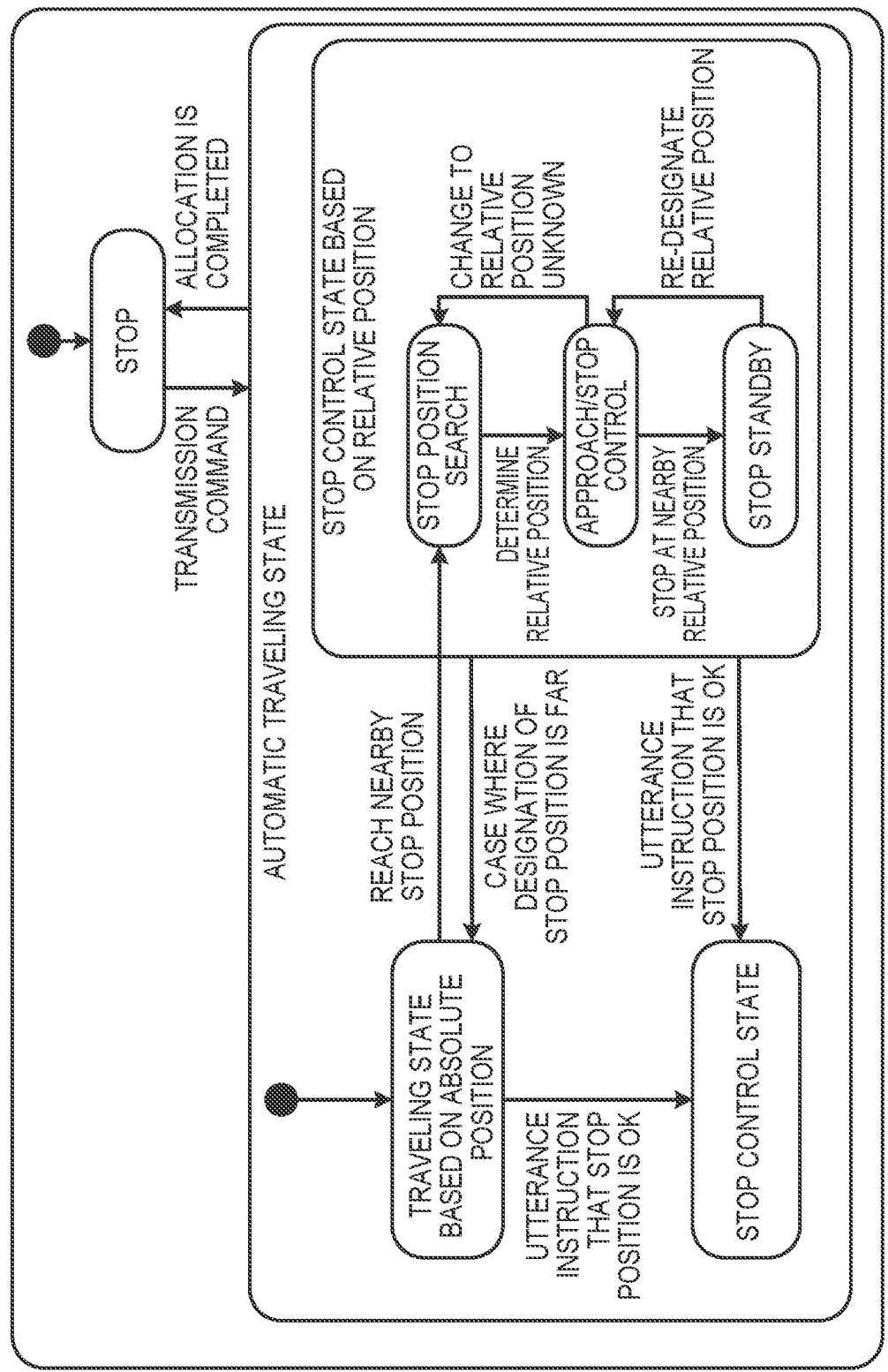
FIG. 6 is a diagram illustrating a state transition of vehicle control in response to an instruction of the stop position according to the present embodiment.

Next, state transition of traveling system control of the vehicle 100 according to the instruction of the stop position will be described with reference to FIG. 6. First, when the state transition of the vehicle 100 is started, the vehicle 100 enters a "stopped" state. In this state, when a transmission command such as the pick-up request is input, the vehicle 100 enters an automatic traveling state. The automatic traveling state roughly includes a "traveling state based on the absolute position", a "stop control state based on the relative position", and a "stop control state".

In the "traveling state based on the absolute position", as described above, when the vehicle 100 receives the pick-up request from the user, the vehicle 100 first sets the first stop position as the absolute position. For example, when the utterance information of the pick-up request includes a mark, the vehicle 100 sets the position of the mark as the absolute position, and when the utterance information does not include the mark, the vehicle sets the position of the user (GPS position information of the communication device 120) as the absolute position. Thus, the vehicle 100 transitions to the "traveling state based on the absolute position" in the "automatic traveling state" and starts traveling. The vehicle 100 may confirm the stop position with the user 130 while traveling. When the utterance information of the user 130 indicates that the stop position is the current stop position, the vehicle 100 transitions to the stop control state when arriving at the stop position. For example, when a predetermined time has elapsed in the stop control state, the vehicle 100 determines that allocation has been completed, and transitions the state to "stop".

When the vehicle 100 approaches the stop position (set at the absolute position) to such an extent that the user, a target as a mark, or the like can be visually confirmed, the state transitions to "stop position search" of the "stop control state based on the relative position". During the stop position search, the vehicle 100 specifies a user or a mark, and sets the stop position at the relative position of the specified mark or the like. For example, the vehicle 100 transmits utterance information for confirming the stop position to the user 130. As in the above-described example, when the vehicle 100 acquires the utterance information 551 of "No, stop over there", the vehicle 100 specifies an indication target (vending machine 500), sets the relative position of the indication target to the stop position, and transitions to the "approach/stop control" state.

In the "approach/stop control" state, the vehicle 100 moves toward the set stop position. At this time, when the vehicle 100 cannot detect a mark serving as the stop position from the image information due to, for example, appearance of an obstacle in front of the vehicle 100, the state of the vehicle 100 is transitioned to "stop position search". As described above, when the vehicle 100 approaches the stop position during traveling using the relative position, the vehicle 100 may control the traveling speed according to the remaining distance. When arriving at the relative position, the vehicle 100 stops and enters a stopped standby state. When utterance information for re-designating the relative position is acquired from the user 130 in the stopped standby state, the vehicle 100 resets the stop position and returns the state to the "approach/stop control" state. When the utterance information of the user 130 indicates that the stop position is correct, such as "Thank you", the vehicle 100 transitions to the stop control state.

In each state of "stop position search", "approach/stop control", and "stopped standby", the vehicle 100 may set a travel control parameter corresponding to each state and control the travel of the vehicle according to the vehicle speed control parameter. For example, for each state of "stop position search", "approach/stop control", and "stopped standby", a predetermined target (limit) vehicle speed, target acceleration/deceleration, and lowest state maintaining time may be held as a table, and the vehicle speed and the like may be controlled according to the transition of the state. For example, in the state of "stop position search", a target vehicle speed may be lower than that in the state of "approach/stop control" where the stop position has already been determined because there is a high possibility that a travel route on which the stop position is determined is (newly) changed. That is, the target vehicle speeds for "stop position search", "approach/stop control", and "stopped standby" may be set to be (A, B, 0) (where A<B). In this way, it is possible to realize traveling in accordance with the acceleration/deceleration and the target vehicle speed set for each state along with the transition of the state. The traveling control of the vehicle 100 is not limited to this example. As will be described later, the vehicle speed may be controlled according to a degree of certainty with respect to the stop position.

(Series of Operations of Stop-Position Determination Processing)

Figure 7:
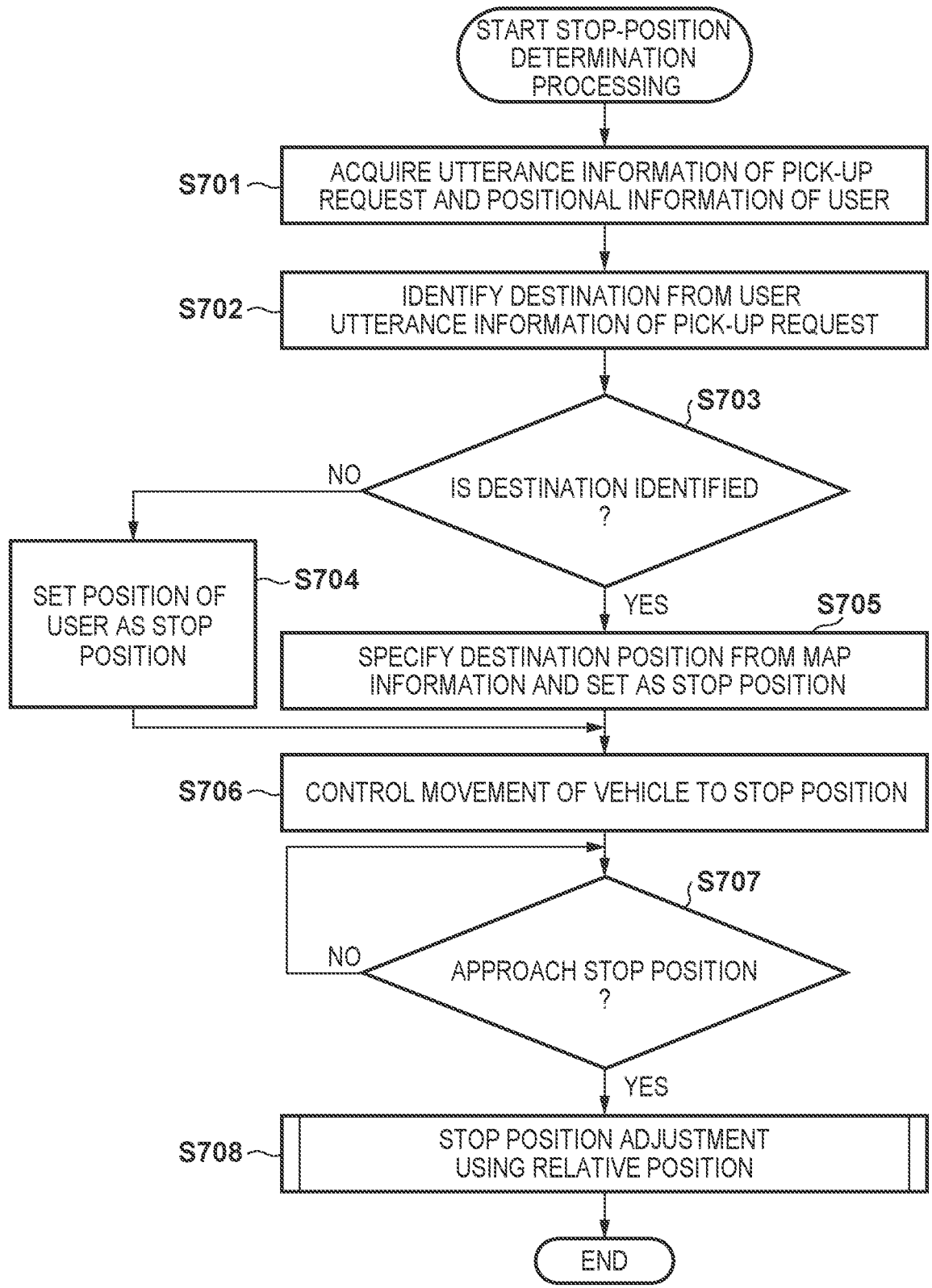
FIG. 7 is a flowchart illustrating a series of operations of stop-position determination processing according to the present embodiment.

Next, a series of operations of the stop-position determination processing in the vehicle 100 will be described with reference to FIG. 7. Note that the present processing is realized by the control unit 30 executing a program. In the following description, it is assumed that the control unit 30 executes each process for the sake of simplicity of description; however, corresponding processing is executed by each part of the interaction unit 401 and the vehicle control unit 402 (described above with reference to FIG. 4).

In S701, the control unit 30 receives the utterance information of the pick-up request and the position information of the user from the communication device 120. The utterance information of the pick-up request includes, for example, an utterance such as "Can you come soon?" described above with reference to FIG. 5A. The utterance information of the pick-up request may be information including a destination, such as "Can you come soon in front of AAA?". The position information of the user is, for example, position information detected by the communication device 120. In S702, the control unit 30 identifies the destination from the user utterance information of the pick-up request. For example, the control unit 30 may identify "AAA" as the destination from the utterance information like "Can you come soon in front of AAA?". When the utterance information includes no destination like "Can you come soon?", the control unit 30 may determine that the destination cannot be identified. Furthermore, the control unit 30 may transmit utterance information, such as asking for a destination, to the communication device 120, and additionally acquire utterance information including the destination.

In S703, the control unit 30 determines whether the destination has been identified. For example, when the utterance information of the pick-up request includes a word indicating the destination, the control unit 30 determines that the destination has been identified and advances the processing to S705, and otherwise advances the processing to S704.

In S704, the control unit 30 sets the position of the user as the stop position (when the destination cannot be identified from the utterance information). At this time, the position information of the user is the absolute position. By setting the position of the user as the stop position, the vehicle 100 first travels on a route approaching the user toward the position of the user.

In S705, the control unit 30 specifies the identified destination position from the map information and sets the specified destination position as the stop position. For example, the control unit 30 searches for the name of AAA as the destination from the map information, and sets the position information (for example, latitude/longitude information) obtained by the search as the stop position. Also in this case, the position information is the absolute position.

In S706, the control unit 30 moves the vehicle 100 to the set stop position. For example, the control unit 30 determines a travel route to the stop position based on the map information, and travels according to the travel route.

In S707, the control unit 30 determines whether the vehicle approaches the stop position. For example, the control unit 30 acquired current position information of the vehicle 100, and determines whether the position information is within a predetermined distance from the latitude and longitude determined as the stop position. When the current position of the vehicle is within the predetermined distance from the stop position, the control unit 30 determines that the vehicle approaches the stop position and advances the processing to S708, and otherwise, the control unit 30 returns the processing to S707 (that is, repeats the determination while the vehicle travels on a route).

In S708, the control unit 30 executes stop position adjustment processing using the relative position. Details of the stop position adjustment processing will be described later with reference to FIG. 8. Upon completion of the stop position adjustment processing using the relative position, the control unit 30 then terminates the series of operations.

(Operation of Stop Position Adjustment Processing Using Relative Position)

Figure 8A:
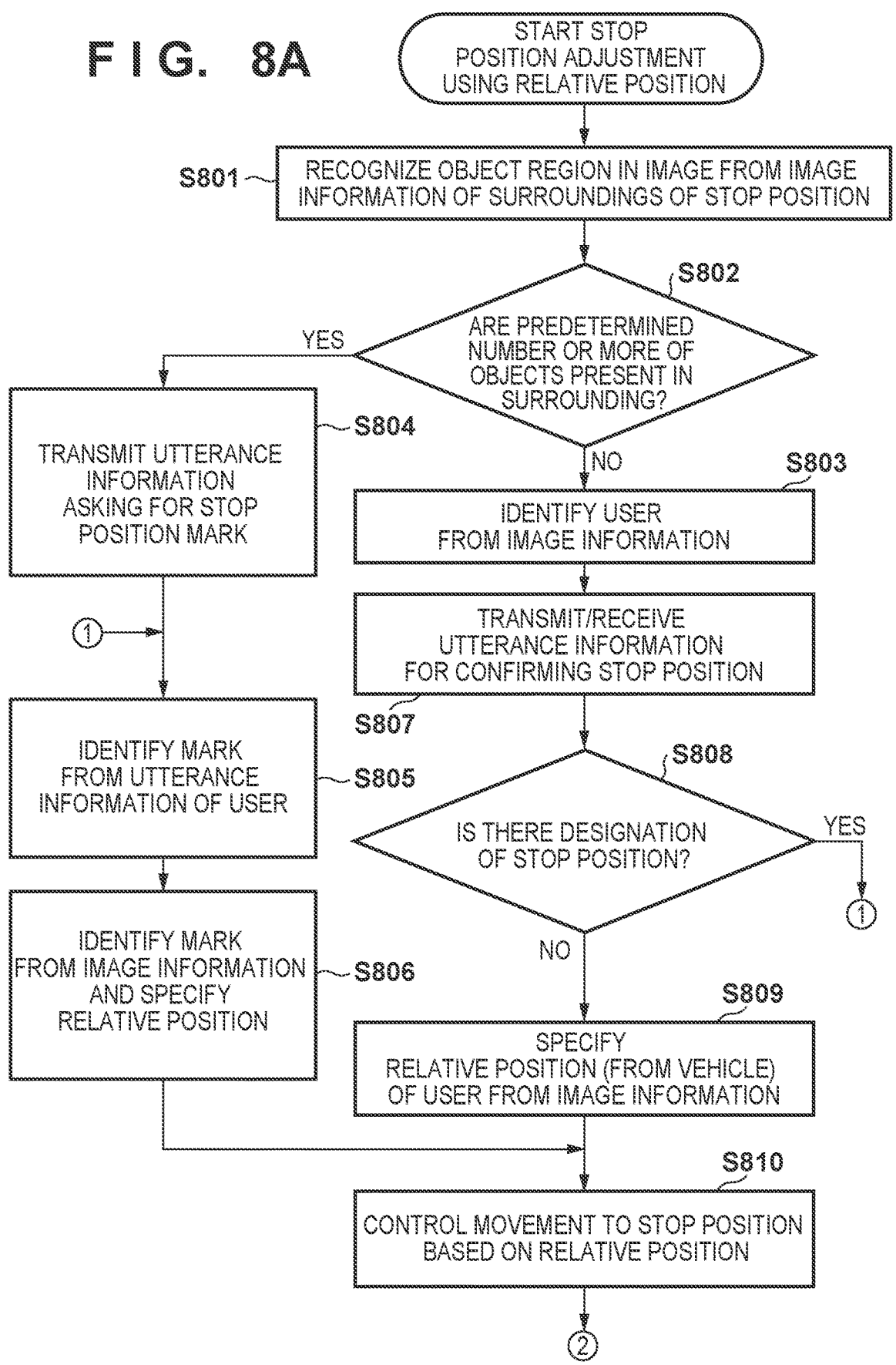
FIG. 8A is a flowchart (1) illustrating a series of operations of stop position adjustment processing using a relative position according to the present embodiment.
Figure 8B:
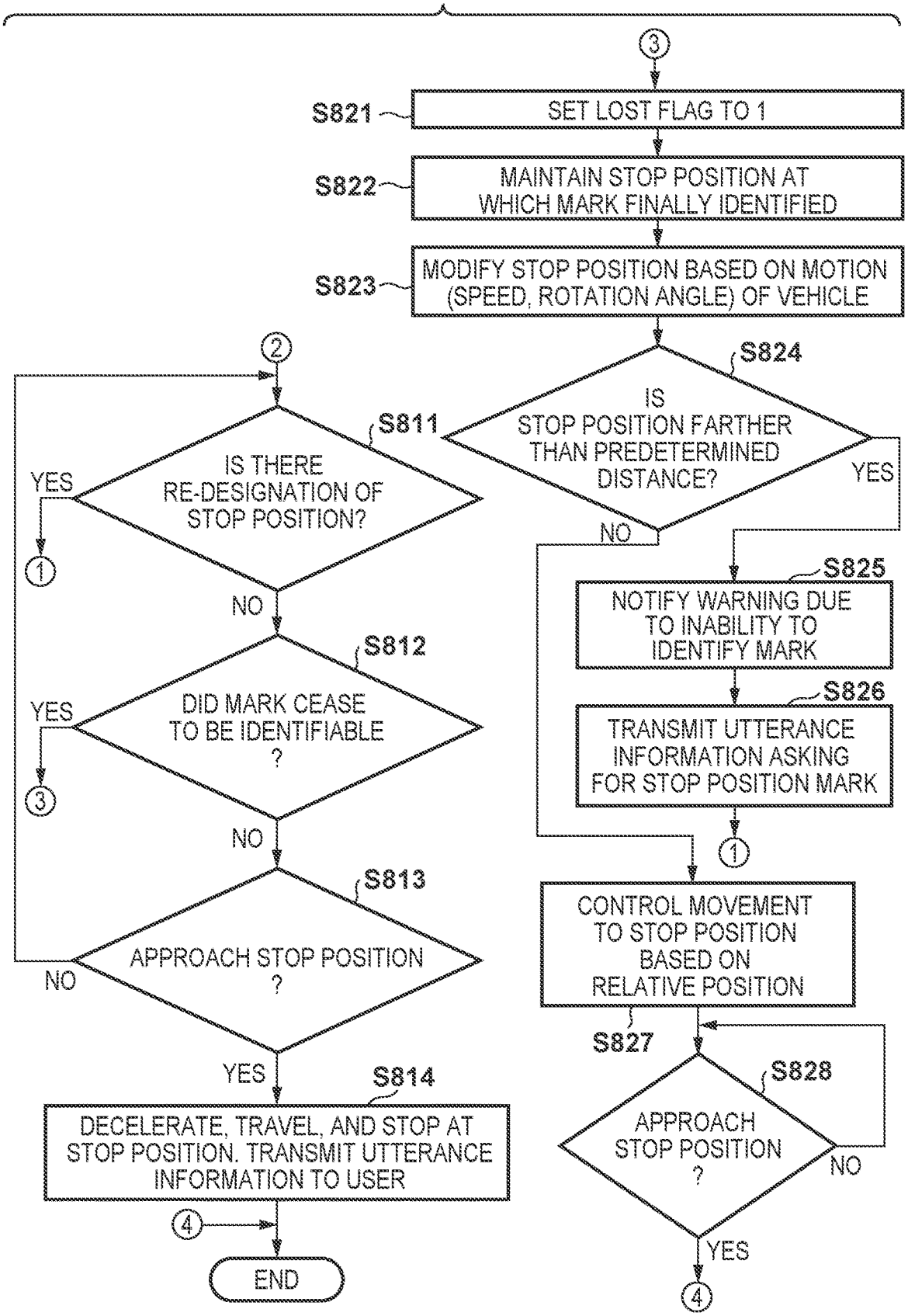
FIG. 8B is a flowchart (2) illustrating a series of operations of the stop position adjustment processing using the relative position according to the present embodiment.

In addition, the operation of the stop position adjustment processing using the relative position in the vehicle 100 will be described with reference to FIGS. 8A and 8B. The present processing is realized by the control unit 30 executing a program, similarly to the processing illustrated in FIG. 7. This processing is processing of specifying the relative position of a user or a target as a mark identified by the image information acquired by the detection unit 15 and the like, and controlling traveling to the stop position using the relative position based on the image information. In other words, this processing generally corresponds to the processing in the "stop control state based on the relative position" described above with reference to FIG. 6.

In S801, the control unit 30 performs object recognition processing on the image acquired by the detection unit 15 and the like, to identify an object region in the image (corresponding to the visual mark).

In S802, the control unit 30 determines whether a predetermined number or more of objects are present in the surroundings. For example, the control unit 30 determines whether the number of object regions identified in S801 is the predetermined number or more. When the number of object regions is the predetermined number or more, the control unit 30 advances the processing to S804, and otherwise advances the processing to S803.

In S803, the control unit 30 identifies the user from the image information. At this time, the control unit 30 may further identify a user action, such as a hand gesture or a pointing action, of the user. The utterance information for limiting a target person when specifying the user, such as "Can you wave your hand?" or "Are you wearing red clothes?", may be transmitted to the communication device 120.

In S804, the control unit 30 transmits utterance information asking for a mark of the stop position to the communication device 120. As described above, when the number of regions detected in the image is equal to or larger than a certain number, it is difficult to specify the mark with high accuracy only from an image recognition result. Thus, when the number of regions detected in the image is equal to or larger than a certain number, the mark is identified using the utterance information and the image information by utilizing the utterance information such as transmitting the utterance information asking for a mark of the stop position. The control unit 30 may transmit additional utterance information for narrowing down visual marks, for example "Red vending machine?". When the visual mark cannot be narrowed down to one in a relationship between the utterance information of the user 130 and the image information of the vehicle 100, it is possible to reduce ambiguity of the visual mark by obtaining additional utterance information from the user. This makes it possible to identify a mark with higher accuracy.

In S805, the control unit 30 acquires the utterance information of the user and identifies the mark from the utterance information. At this time, the control unit 30 may further identify a user action, such as a hand gesture or a pointing action, of the user. For example, when the utterance information of the user 130 is "Stop over there", "over there" which is the instruction word is identified. Furthermore, when the utterance information of the user 130 is "Stop in front of the vending machine", the control unit 30 identifies "vending machine" as the mark.

In S806, the control unit 30 identifies the mark corresponding to the utterance information identified in S805 from the image information, and specifies the relative position. For example, when "over there" is identified from the utterance information of the user, the control unit 30 recognizes the pointing of the user in the image and identifies an object in that direction as the mark. When the "vending machine" is identified from the utterance information, the control unit 30 identifies a region of the vending machine in the image information. Then, the control unit 30 specifies the relative position of the identified object. As described above, a relative distance is a position viewed from the vehicle 100, and is represented by, for example, 1 m to the left and 10 m to the front.

A probability distribution indicating a probability corresponding to a visual mark may be calculated for one or more object regions in the image. For example, when the mark included in the utterance information is "vending machine" and there are two or more regions of "vending machine" in the image, the control unit 30 may calculate the probability distribution of the object region further based on a limited linguistic element (for example, "blue") of the utterance content. In this case, for example, when there are a blue vending machine and a red vending machine in the image, a probability distribution in which the probability of the blue vending machine is "0.90" and the probability of the red vending machine is "0.10" may be calculated.

When the mark included in the utterance information is "vending machine" and there are two or more regions of "vending machine" in the image, the same probability may be assigned to both object regions. At this time, the control unit 30 may further vary the probability distribution according to a relative positional relationship between the target serving as the visual mark and the user 130. If the red vending machine is closer to the current position of the user 130 or the vehicle 100, the control unit 30 may correct the probability distribution so that the probability of the red vending machine is "0.6" and the probability of the blue vending machine is "0.4". It is possible to provide the probability distribution in which the probability increases in the order in which the vending machine can become a candidate when viewed from a direction in which the user approaches.

When the utterance information includes a positional relationship with an object such as "a vending machine on the left side of a building", the control unit 30 may calculate the probability distribution in consideration of a relative positional relationship as viewed from the vehicle 100. For example, the probability of the region of the vending machine on the left side of the building may be calculated as "0.9", and the probability of the region of the vending machine on the right side of the building may be calculated as "0.1".

When calculating the probability distribution with respect to the mark, the control unit 30 identifies an object having the highest probability as the mark and specifies the relative position thereof.

In S807, the control unit 30 transmits the utterance information for confirming the stop position to the communication device 120. For example, the control unit 30 transmits the utterance information such as "I will stop in front of you" to the communication device 120. Furthermore, the control unit 30 receives utterance information regarding confirmation by the user 130 for the utterance information for confirming the stop position. For example, the control unit 30 receives utterance information of "No, go over there".

In S808, the control unit 30 determines whether the received utterance information includes designation of the stop position. That is, the control unit 30 determines whether there is a designation to change the stop position in response to the confirmation of the stop position in S807. For example, when the control unit 30 determines that the utterance information of the user 130 includes designation of a location such as "over there" or "in front of the vending machine", the control unit 30 advances the processing to S805, and otherwise advances the processing to S809. The processing proceeds to S809, for example, when utterance information of "OK" has been received from the user 130.

In step S809, the control unit 30 specifies the relative position of the user or the target as the mark identified by the image information. As described above, a relative distance is a position viewed from the vehicle 100, and is represented by, for example, 1 m to the left and 10 m to the front.

In S810, the control unit 30 sets the specified relative position as the stop position, and controls traveling to the stop position. At this time, when the mark of the stop position is identified in the image information, the stop position is updated to the position of the mark. As described above, the control unit 30 may control the traveling speed according to the remaining distance to the stop position. The traveling speed may be adjusted according to the degree of certainty of the stop position. For example, when there are a plurality of visual marks (for example, two vending machines) obtained from the utterance information of the user on the image, the control unit 30 can assign the probability distribution to each vending machine according to the user's utterance and the relative position as described above. In this case, the control unit 30 may use the value of the probability distribution as the degree of certainty. That is, when the degree of certainty is low, the control unit 30 reduces the traveling speed more than when the degree of certainty is high. In this way, when the stop position is highly likely to be changed, it is possible to travel while suppressing the speed of the vehicle and to prepare for the change of the stop position.

In S811, the control unit 30 determines whether there is re-designation of the stop position (for example, reception of utterance information for designating the stop position from the user 130). When the control unit 30 determines that there is re-designation of the stop position, the control unit 30 advances the processing to S805, and otherwise advances the processing to S812.

In S812, the control unit 30 determines whether the mark ceased to be identifiable. When the mark for the stop position ceased to be identifiable in the image information, the control unit 30 advances the processing to S821, and otherwise (mark remains identifiable) advances the processing to S813. When an object such as a truck or a tree is present in front of the vehicle 100 so that the mark for the stop position ceases to be visible, the control unit 30 ceases to be able to identify the mark for the stop position in the image information. In such a case, in order to suitably control the stop position of the vehicle 100, the control unit 30 stops the vehicle 100 by performing processing of S821 to S828 described later.

In S813, the control unit 30 determines whether a distance to the stop position has become within a predetermined distance. The control unit 30 advances the processing to S814 when the distance to the stop position has become within the predetermined distance, and otherwise returns the processing to S811.

In S814, in the control unit 30, since the stop position is not re-designated and the vehicle approaches the stop position, the vehicle decelerates, travels, and stops at the stop position. At this time, the control unit 30 transmits utterance information (for example, "Sorry to keep you waiting") notifying of arrival to the communication device 120. Thereafter, the control unit 30 ends the stop position adjustment processing using the relative position, and returns to a calling-source processing. Then, the control unit 30 also ends the series of processes illustrated in FIG. 7.

In step S821, the control unit 30 sets "lost flag" indicating that an object as the mark cannot be identified to 1. When the object as the mark can be detected again from the image information during the processing of S821 to S828, the control unit 30 can control the movement to the stop position by returning the lost flag to 0 and returning the processing to S811. Therefore, the processing of S822 to S828 is executed when the lost flag indicates 1.

In step S822, the control unit 30 maintains the stop position at which the object as the mark has been finally identified. In S823, the control unit 30 modifies the stop position (represented by the relative position) based on the motion of the vehicle 100. The motion of the vehicle 100 is the acceleration, rotational acceleration, or the like of the vehicle 100 output from the traveling unit 12. The control unit 30 corrects the stop position by predicting a change in the relative position in consideration of the motion of the vehicle 100.

In step S824, the control unit 30 determines whether the distance to the stop position is longer than a predetermined distance. Upon determining that the distance to the stop position is longer than the predetermined distance, the control unit 30 advances the processing to S825, and otherwise advances the processing to S827. The predetermined distance is a distance that can be traveled with an allowable error while the stop position is updated by the vehicle motion, which is determined by an experiment and the like.

Figure 8C:
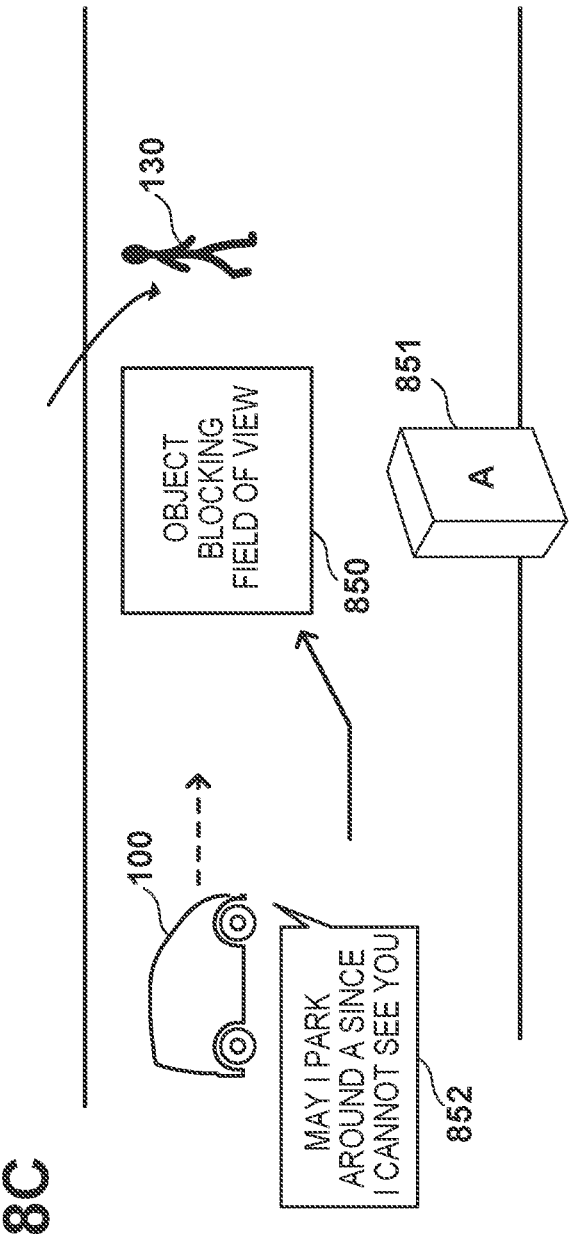
FIG. 8C is a diagram (1) illustrating a control example of the vehicle in a case where an object as a mark cannot be recognized.

FIG. 8C illustrates an example of control by the control unit 30 in the case where the distance to the stop position is longer than the predetermined distance. In this example, in order to simplify the description, a case where the stop position is the position of the user 130 is illustrated. In this case, an example is illustrated in which the control unit 30 cannot identify the user 130 in the image due to an object 850 in the traveling direction of the vehicle 100. When the distance from the vehicle 100 to the stop position is long, if the stop position is continuously updated by the vehicle motion, a large deviation may occur in the stop position. Thus, in the present embodiment, the control unit 30 transmits notification to the communication device 120. This notification may include utterance information indicating a warning due to the inability to identify the object as the mark, and utterance information 852 (for example, "May I park around A?") for asking for a mark (for example, the object 851) of a new stop position. The mark of the new stop position may be determined by searching for an object (for example, at a position separated by about 20 m) included in the image.

As described above, the control unit 30 transmits, for example, the utterance information for notifying a warning due to the inability to identify the mark in S825, and further transmits the utterance information for asking for the mark of the stop position to the communication device 120 in S826. Then, the control unit 30 returns the processing to S805. At this time, the control unit 30 may reduce the moving speed and cause the vehicle to travel until the mark of the new stop position is designated (for example, until the user's utterance information including the mark is received). In this way, when the distance from the vehicle 100 to the stop position is long, a new mark can be acquired to resume traveling to the new stop position.

Figure 8D:
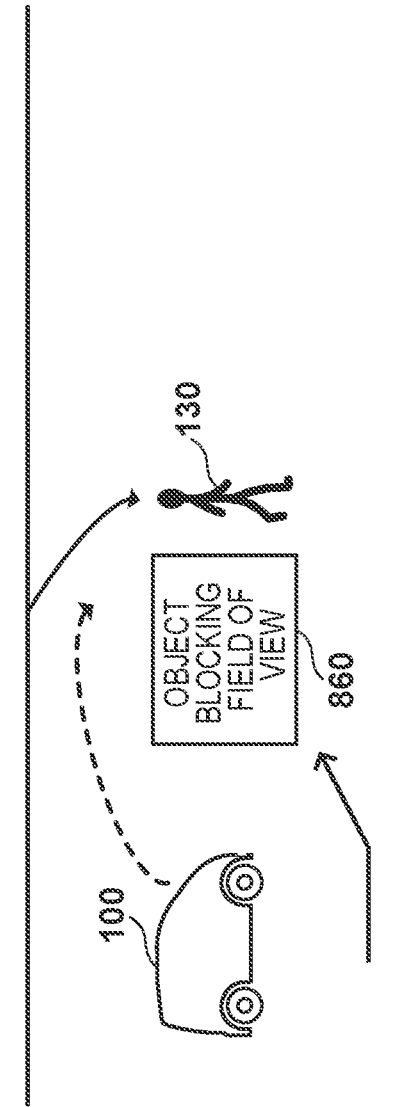
FIG. 8D is a diagram (2) illustrating a control example of the vehicle in the case where the object as the mark cannot be recognized.

FIG. 8D illustrates an example of control by the control unit 30 in a case where the distance to the stop position is within a predetermined distance. Also in this example, in order to simplify the description, the case where the stop position is the position of the user 130 is illustrated. In this case, an example is illustrated in which the control unit 30 cannot identify the user 130 in the image due to an object 860 in the traveling direction of the vehicle 100. When the distance to the stop position is the predetermined distance or less, even if the stop position for the same mark is continuously updated by the vehicle motion, a large deviation is less likely to occur in the stop position. Thus, the control unit 30 continues movement to the stop position (depending on the relative position) while updating the stop position with the vehicle motion.

As described above, the control unit 30 controls the movement to the stop position based on the relative position in S827, and determines whether the vehicle approaches the stop position in S828. The control unit 30 advances the processing to S814 when determining that the vehicle approaches the stop position, and otherwise returns the processing to S828 (that is, continues to update the stop position with the vehicle motion).

As described above, the vehicle 100 first approaches to such an extent that the user, the target serving as the mark, or the like can be visually confirmed using the absolute position, and then stops at a desired position of the user 130 by adjusting the stop position with the user 130 based on the voice information (utterance information) and the image information. In this way, the stop position of the vehicle (mobile body) can be flexibly adjusted between the user and the vehicle (mobile body).

When the object serving as the mark of the stop position cannot be identified after the stop position is determined based on the image information, the vehicle travels while updating the stop position set by the mark according to the motion of the vehicle. That is, even when a visual mark cannot be identified, the vehicle 100 is moved using the stop position where the mark has been finally identified. In this way, it is possible to reduce occurrence of an operation in which the vehicle 100 stops as soon as the mark cannot be identified. Then, utterance information for warning the user is transmitted according to the distance to the stop position, and a new stop position is set by another target (mark). In this way, when the stop of the vehicle 100 is controlled using the relative position, it is possible to prevent occurrence of a large deviation in the stop position. In addition, by transmitting the utterance information for asking for the mark of the stop position to the communication device 120, the mark of the new stop position can be acquired from the utterance information of the user, and traveling to another stop position can be resumed.

(Modifications)

Hereinafter, modifications according to the present invention will be described. In the above embodiment, the example in which the stop-position determination processing is executed in the vehicle 100 has been described. However, the stop-position determination processing can also be executed on the server side. In this case, as illustrated in FIG. 9, an information processing system 900 includes a vehicle 910, the communication device 120, and a server 901.

A configuration of the information processing system 900 according to the present embodiment will be described with reference to FIG. 9. The information processing system 900 includes the vehicle 910, the server 901, and the communication device 120. The server 901 includes one or more server devices, and is capable of acquiring, via the network 140, information on the vehicle transmitted from the vehicle 910, and the utterance information and the position information transmitted from the communication device 120, and controlling traveling of the vehicle 910. The server can generally use more abundant calculation resources than the vehicle and the like. In addition, it is possible to collect training data under a wide variety of circumstances by receiving and accumulating data on images captured by various vehicles, so that it is possible to perform learning in response to a wider variety of circumstances.

For example, in the embodiment according to the present modification, the utterance information of the user is transmitted from the communication device 120 to the server 901. The server 901 acquires image information captured by the vehicle 910 as part of floating data of the vehicle 910 together with position information and the like via the network 140. For example, after the server 901 performs processing corresponding to S701 to S705 of the stop-position determination processing described above, the server 901 transmits a control amount such as the traveling speed to the vehicle 910 in S706. The vehicle 910 travels (continues traveling) according to the received control amount. Subsequently, the server 901 executes processing corresponding to S707 and S708. The server 901 executes processing corresponding to S801 to S809 also in the stop position adjustment processing using the relative position, and transmits the control amount such as the traveling speed to the vehicle 910 in S810. The vehicle 910 travels (continues traveling) according to the received control amount. Subsequently, the server 901 executes processing corresponding to S811 to S814 and S821 to S826. These processing executed by the server 901 are implemented by a processor (not illustrated) included in the server 901 executing a program stored in a non-transitory computer-readable storage medium (not illustrated) included in the server 901.

The configuration of the vehicle 910 may be the same as that of the vehicle 100 except that the control unit 30 does not execute the stop-position determination processing and the vehicle is caused to travel according to the control amount from the server 901.

As described above, the server 901 causes the vehicle to approach to such an extent that the user, the target serving as the mark, or the like can be visually confirmed using the absolute position, and then stops the vehicle at a desired position of the user 130 by adjusting the stop position with the user 130 based on the voice information (utterance information) and the image information. In this way, the stop position of the vehicle (mobile body) can be flexibly adjusted between the user and the vehicle (mobile body). When the object serving as the mark of the stop position cannot be identified after the stop position is determined based on the image information, the vehicle travels while updating the stop position set by the mark according to the motion of the vehicle. That is, even when a visual mark cannot be identified, the vehicle is moved using the stop position where the mark has been finally identified. In this way, it is possible to reduce occurrence of the operation in which the vehicle stops as soon as the mark cannot be identified.

In the above-described embodiment, it has been described that the stop position of the vehicle (mobile body) is adjusted between the user who is going to join and the vehicle (mobile body); however, the application of the present invention is not limited thereto. For example, the present invention may be applied to a case where the user instructs the stop position based on the target serving as the mark while riding on the vehicle (mobile body). For example, in a state where the user rides on the mobile body, the mobile body determines the stop position while responding "Is that red vending machine?" or the like in response to the utterance (instruction) of the user "stop in front of the vending machine over there". Thereafter, it is conceivable that the mobile body adjusts the stop position based on an instruction such as "Stop at the convenience store over there" from the user.

Summary of Embodiments

1. In embodiments of the present invention a mobile body control device (for example, 30) that adjusts a stop position of a mobile body (for example, 100) based on an instruction of the user is provided, the mobile body control device comprising:
an instruction acquisition unit (for example, 413) configured to acquire, from a communication device used by a user, instruction information for designating a predetermined target;
an image acquisition unit (for example, 15-17) configured to acquire a captured image captured in the mobile body;
a determination unit (for example, 416) configured to determine a stop position, which is a relative position of the predetermined target measured from the mobile body, where a region of the predetermined target has been identified in the captured image; and
a control unit (for example, 402) configured to control traveling of the mobile body in such a way that the mobile body travels toward the determined stop position,
wherein, when the predetermined target cannot be identified in the captured image when the mobile body is traveling toward the stop position, the control unit updates the stop position determined for the predetermined target in accordance with the movement of the mobile body, thereby controlling traveling of the mobile body toward the stop position.

According to this embodiment, it is possible to reduce occurrence of an operation in which the mobile body stops as soon as an objective target cannot be identified. When the user is moving, it is possible to reduce a problem that the distance between the user and the mobile body increases due to the stop of the mobile body.

2. In the mobile body control device according to the above embodiment, the determination unit determines a relative position of the predetermined target with a position of the mobile body as a base point as the stop position based on the region of the predetermined target identified in the captured image.

According to this embodiment, it is possible to determine the stop position by using the relative position with the mobile body as the base point, which is highly convenient when processing using the image is performed.

3. In the mobile body control device according to the above embodiment, the mobile body control device further comprising a processing unit configured to transmit information of an inquiry to a user to the communication device,
wherein in a case where the predetermined target is not identified in the captured image while the mobile body is traveling toward the stop position, the processing unit transmits, to the communication device, the information of the inquiry for setting a new stop position by another target in a case where a distance to the stop position determined for the predetermined target is longer than a predetermined distance.

According to this embodiment, when the stop of the mobile body is controlled using the relative position, it is possible to prevent occurrence of a large deviation in the stop position. Furthermore, it is possible to notify the user that the new stop position is to be reset.

4. In the mobile body control device according to the above embodiment, the information of the inquiry for setting the new stop position includes at least one of information indicating that the predetermined target is not identified and information asking for the target of the new stop position.

According to this embodiment, the user can quickly recognize a cause of the warning and the new stop position.

5. In the mobile body control device according to the above embodiment, the instruction acquisition unit acquires instruction information for designating a second target for the new stop position with respect to the information of the inquiry for setting the new stop position, and the determination unit determines a relative position of the second target
with a position of the mobile body as a base point as the new stop position based on a region of the second target identified in the captured image.

According to this embodiment, it is possible to receive designation of the target for the new stop position from the user and resume traveling to the new stop position.

6. In the mobile body control device according to the above embodiment, the processing unit searches for a target for the new stop position from the captured image, and transmits, to the communication device, the information of the inquiry for setting the new stop position according to a search result.

According to this embodiment, it is possible to suggest the user to use the target, included in a field of view (captured image) of the mobile body, as a mark of the new stop position mark.

7. In the mobile body control device according to the above embodiment, the control unit reduces a moving speed of the mobile body until the determination unit determines a position of the second target from the mobile body as the new stop position.

According to this embodiment, since a traveling direction changes when the new stop position is set, the traveling direction can be safely changed by reducing the moving speed.

8. In the mobile body control device according to the above embodiment, the determination unit determines a first stop position based on position information of the communication device in response to reception of instruction information including a request for pick-up, the control unit controls traveling of the mobile body in such a way that the mobile body travels toward the stop position determined using the captured image in response to an approach of the mobile body from the first stop position by a predetermined distance, the first stop position is determined by an absolute position corresponding to a position on a map, and the stop position determined using the captured image is determined by a relative position of the target with a position of the mobile body as a base point.

According to this embodiment, it is possible for the vehicle to approach to such an extent that the user, the target serving as the mark, or the like can be visually confirmed using the absolute position, and then travel to the stop position based on the relative position obtained from the image.

9. In the mobile body control device according to the above embodiment, the instruction acquisition unit acquires the instruction information for designating the predetermined target after the mobile body approaches from the first stop position by a predetermined distance.

According to this embodiment, it is possible for the vehicle to approach to such an extent that the user, the target serving as the mark, or the like can be visually confirmed using the absolute position, and then set the stop position using the instruction information.

10. In the mobile body control device according to the above embodiment, the mobile body is an ultra-compact mobility vehicle.

According to this embodiment, easy moving means can be used.

11. In the above embodiment, a mobile body control method of adjusting a stop position of the mobile body based on an instruction of a user is provided, the mobile body control method comprising:

acquiring, from a communication device used by a user, instruction information for designating a predetermined target;

acquiring a captured image captured in the mobile body;

determining a position of the predetermined target from the mobile body as a stop position based on a region of the predetermined target identified in the captured image; and controlling traveling of the mobile body in such a way that the mobile body travels toward the determined stop position, wherein in a case where the predetermined target is not identified in the captured image while the mobile body is traveling toward the stop position, the controlling includes updating the stop position determined with respect to the predetermined target according to a motion of the mobile body to control the traveling of the mobile body to the stop position.

According to this embodiment, it is possible to reduce occurrence of an operation in which the mobile body stops as soon as an objective target cannot be identified. When the user is moving, it is possible to reduce a problem that the distance between the user and the mobile body increases due to the stop of the mobile body.

The invention is not limited to the foregoing embodiments, and various variations/changes are possible within the spirit of the invention.

What is claimed is:

1. A mobile body control device that adjusts a stop position of a mobile body based on an instruction of a user, the mobile body control device comprising:

an instruction acquisition unit configured to acquire, from a communication device used by the user, instruction information for designating a predetermined target;

an image acquisition unit configured to acquire a captured image captured in the mobile body;

a determination unit configured to determine a stop position, which is a relative position of the predetermined target measured from the mobile body, where a region of the predetermined target has been identified in the captured image; and a control unit configured to control traveling of the mobile body in such a way that the mobile body travels toward the determined stop position, wherein, when the predetermined target cannot be identified in the captured image when the mobile body is traveling toward the stop position, the control unit updates the stop position determined for the predetermined target in accordance with the movement of the mobile body, thereby controlling traveling of the mobile body toward the stop position.

2. The mobile body control device according to claim 1, wherein the determination unit determines the stop position as a base point based on the region of the predetermined target identified in the captured image.

3. The mobile body control device according to claim 1, further comprising a processing unit configured to transmit information of an inquiry to the user to the communication device, wherein, when the predetermined target cannot be identified in the captured image when the mobile body is traveling toward the stop position, the processing unit transmits, to the communication device, the information of the inquiry for setting a new stop position for another target in a case where a distance to the stop position determined for the predetermined target is longer than a predetermined distance.

4. The mobile body control device according to claim 3, wherein the information of the inquiry for setting the new stop position includes at least one of information indicating that the predetermined target cannot be identified and information asking for the target of the new stop position.

5. The mobile body control device according to claim 3, wherein the instruction acquisition unit acquires instruction information for designating a second target for the new stop position with respect to the information of the inquiry for setting the new stop position, and the determination unit determines the new stop position, which is a relative position of the second target measured from the mobile body, as a base point based on a region of the second target identified in the captured image.

6. The mobile body control device according to claim 3, wherein the processing unit searches for a target for the new stop position from the captured image, and transmits, to the communication device, the information of the inquiry for setting the new stop position according to a search result.

7. The mobile body control device according to claim 5, wherein the control unit reduces a moving speed of the mobile body until the determination unit determines a position of the second target from the mobile body as the new stop position.

8. The mobile body control device according to claim 1, wherein the determination unit determines a first stop position based on position information of the communication device in response to reception of instruction information including a request for pick-up,
the control unit controls traveling of the mobile body in such a way that the mobile body travels toward the stop position determined using the captured image in response to an approach of the mobile body from the first stop position by a predetermined distance,
the first stop position is determined by an absolute position corresponding to a position on a map, and
the stop position determined using the captured image is determined by a relative position of the target with a position of the mobile body as a base point.

9. The mobile body control device according to claim 8, wherein the instruction acquisition unit acquires the instruction information for designating the predetermined target after the mobile body approaches from the first stop position by a predetermined distance.

10. The mobile body control device according to claim 1, wherein the mobile body is an ultra-compact mobility vehicle.

11. A mobile body control method of adjusting a stop position of a mobile body based on an instruction of a user, the mobile body control method comprising:
acquiring, from a communication device used by the user, instruction information for designating a predetermined target;
acquiring a captured image captured in the mobile body;
determining a stop position, which is a relative position of the predetermined target measured from the mobile body, where a region of the predetermined target has been identified in the captured image; and
controlling traveling of the mobile body in such a way that the mobile body travels toward the determined stop position,
wherein, when the predetermined target cannot be identified in the captured image when the mobile body is traveling toward the stop position, the stop position determined for the predetermined target is updated in accordance with the movement of the mobile body, thereby controlling traveling of the mobile body toward the stop position.

12. A mobile body that adjusts a stop position based on an instruction of a user, the mobile body comprising:
an instruction acquisition unit configured to acquire, from a communication device used by the user, instruction information for designating a predetermined target;
an image acquisition unit configured to acquire a captured image captured in the mobile body;
a determination unit configured to determine a stop position, which is a relative position of the predetermined target measured from the mobile body, where a region of the predetermined target has been identified in the captured image; and
a control unit configured to control traveling of the mobile body in such a way that the mobile body travels toward the determined stop position,
wherein, when the predetermined target cannot be identified in the captured image when the mobile body is traveling toward the stop position, the control unit updates the stop position determined for the predetermined target in accordance with the movement of the mobile body, thereby controlling traveling of the mobile body toward the stop position.

13. An information processing method executed by an information processing apparatus that adjusts a stop position of a mobile body based on an instruction of a user, the information processing method comprising:
acquiring, from a communication device used by the user, instruction information for designating a predetermined target;
acquiring, from the mobile body, a captured image captured in the mobile body and information related to a motion of the mobile body;
determining a stop position, which is a relative position of the predetermined target measured from the mobile body, where a region of the predetermined target has been identified in the captured image; and
transmitting, to the mobile body, a control command for controlling traveling of the mobile body in such a way that the mobile body travels toward the determined stop position,
wherein, when the predetermined target cannot be identified in the captured image when the mobile body is traveling toward the stop position, the stop position determined for the predetermined target is updated in accordance with the movement of the mobile body, thereby controlling traveling of the mobile body toward the stop position.

14. A non-transitory computer-readable storage medium that stores a program for causing a computer to function as each unit of a mobile body control device that adjusts a stop position of a mobile body based on an instruction of a user, the mobile body control device including:
an instruction acquisition unit configured to acquire, from a communication device used by the user, instruction information for designating a predetermined target;
an image acquisition unit configured to acquire a captured image captured in the mobile body;
a determination unit configured to determine a stop position, which is a relative position of the predetermined target measured from the mobile body, where a region of the predetermined target has been identified in the captured image; and
a control unit configured to control traveling of the mobile body in such a way that the mobile body travels toward the determined stop position,
wherein, when the predetermined target cannot be identified in the captured image when the mobile body is traveling toward the stop position, the control unit updates the stop position determined for the predetermined target in accordance with the movement of the mobile body, thereby controlling traveling of the mobile body toward the stop position.

* * * * *